United States Patent
Zhang et al.

(10) Patent No.: US 10,728,205 B2
(45) Date of Patent: *Jul. 28, 2020

(54) MULTI-STANDARD MESSAGE PROCESSING

(71) Applicant: Amadeus S.A.S., Biot (FR)

(72) Inventors: Yizhen Zhang, Sophia-Antipolis (FR); Simone Campora, London (GB); Ivan Xavier Marchand, Westford, MA (US); Loïc Fontolliet, Boston, MA (US)

(73) Assignee: Amadeus S.A.S., Biot (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/382,829

(22) Filed: Apr. 12, 2019

(65) Prior Publication Data

US 2019/0238495 A1    Aug. 1, 2019

Related U.S. Application Data

(63) Continuation of application No. 15/617,180, filed on Jun. 8, 2017, now Pat. No. 10,284,515.

(51) Int. Cl.
| | |
|---|---|
| *G06F 15/16* | (2006.01) |
| *H04L 12/58* | (2006.01) |
| *H04L 29/08* | (2006.01) |
| *H04L 29/06* | (2006.01) |
| *G09B 21/00* | (2006.01) |

(52) U.S. Cl.
CPC ............ *H04L 51/36* (2013.01); *H04L 67/02* (2013.01); *H04L 67/38* (2013.01); *G09B 21/009* (2013.01)

(58) Field of Classification Search
None
See application file for complete search history.

(56) References Cited

U.S. PATENT DOCUMENTS

| | | |
|---|---|---|
| 7,240,097 B2 | 7/2007 | Holdsworth et al. |
| 7,680,793 B2 | 3/2010 | Wong et al. |

(Continued)

FOREIGN PATENT DOCUMENTS

EP    2254046 A1    11/2010

OTHER PUBLICATIONS

Sia Partners, "NDC Solutions White Paper", Dec. 2016.

(Continued)

*Primary Examiner* — Phuoc H Nguyen
(74) *Attorney, Agent, or Firm* — Thompson Hine LLP

(57) ABSTRACT

Messages are processed in a distributed messaging system by a message processing engine. Message targets operates according to a first standard or a second legacy standard. In response to receiving a database commit indication, a message envelope is generated for each message target to be notified operating according to the first standard and at least one messages within each message envelope. Message envelope dependencies between generated message envelopes for a same message target are computed. Message dependencies between the messages within each message envelope are computed based at least on the standard of the messages of the respective message envelope and functions of the messages. The messages are sent to the respective message target in a sequence based on the message envelope dependencies and the message dependencies.

20 Claims, 14 Drawing Sheets

(56) References Cited

U.S. PATENT DOCUMENTS

| | | |
|---|---|---|
| 7,702,739 B1 | 4/2010 | Cheng et al. |
| 7,991,847 B2 | 8/2011 | Cadoret et al. |
| 8,200,765 B2 | 6/2012 | Bittles et al. |
| 8,875,155 B2 | 10/2014 | Johnson, III et al. |
| 2002/0077134 A1* | 6/2002 | Mizell .................... H04W 4/14 455/466 |
| 2003/0158883 A1 | 8/2003 | Drudis et al. |
| 2004/0019645 A1 | 1/2004 | Goodman et al. |
| 2006/0146848 A1 | 7/2006 | Kirstein et al. |
| 2007/0124398 A1 | 5/2007 | Parkinson et al. |
| 2016/0286027 A1* | 9/2016 | Lee .................. H04M 1/72552 |

OTHER PUBLICATIONS

Iata, "NDC Fact Sheet", retrieved from the internet at http://www.iata.org/whatwedo/airline-distribution/ndc/Documents/ndc-fact-sheet.pdf on Jun. 9, 2017.

Iata, "NDC Change Readiness Guide for Airlines", Third Edition, Oct. 2016.

National Institute of Industrial Property, Preliminary Search Report issued in French Application No. 1755105 dated Apr. 18, 2018.

\* cited by examiner

Table III. Dependency maps after sending messages of message envelope 1.

| ID | P | I | J | RD_STAT | D_ID | D_STAT | N | TYPE | Message |
|---|---|---|---|---|---|---|---|---|---|
| 001 | AAAAAA | 0 | YY | S | NULL | NULL | NULL | NULL | NULL |
| 002 | BBBBBB | 0 | ZZ | S | NULL | NULL | NULL | NULL | NULL |
| 003 | AAAAAA | 0 | YY | NULL | 001 | S | | TTY | T | $M_{YY}^{A(0),TTY}(1)'$ |
| 004 | AAAAAA | 1 | ZZ | S | 001 | NULL | NULL | NULL | NULL |
| 005 | AAAAAA | 1 | ZZ | NULL | 004 | S | | DEL | X | $M_{ZZ}^{A(1),DEL}(1)'$ |
| 006 | BBBBBB | 0 | ZZ | NULL | 005 | V | | TTY | T | $M_{ZZ}^{B(0),TTY}(1)'$ |
| 007 | AAAAAA | 1 | ZZ | NULL | 005 | S | | TTY | T | $M_{ZZ}^{A(1),TTY}(2)'$ |
| 008 | BBBBBB | 0 | ZZ | NULL | 006 | S | | ADD | X | $M_{ZZ}^{B(0),ADD}(2)'$ |
| 009 | BBBBBB | 1 | YY | S | 002 | NULL | NULL | NULL | NULL |
| 010 | BBBBBB | 1 | YY | NULL | 009 | S | | TTY | Y | $M_{ZZ}^{B(1),TTY}(1)'$ |
| 011 | AAAAAA | 1 | YY | S | 001 | NULL | NULL | NULL | NULL |
| 012 | AAAAAA | 1 | YY | NULL | 011 | S | | ADD | X | $M_{YY}^{A(1),ADD}(1)'$ |
| 013 | BBBBBB | 2 | YY | N | 009 | NULL | NULL | NULL | NULL |
| 014 | BBBBBB | 2 | YY | NULL | 013 | N | | DEL | X | $M_{YY}^{B(2),DEL}(1)'$ |
| 015 | BBBBBB | 2 | YY | NULL | 014 | D | | TTY | T | $M_{YY}^{B(2),TTY}(2)'$ |
| 016 | AAAAAA | 2 | ZZ | N | 004 | NULL | NULL | NULL | NULL |
| 017 | AAAAAA | 2 | YY | N | 011 | NULL | NULL | NULL | NULL |
| 018 | AAAAAA | 2 | ZZ | NULL | 007 | N | | TTY | T | $M_{ZZ}^{A(2),TTY}(1)'$ |
| 019 | AAAAAA | 2 | YY | NULL | 017 | N | | DEL | X | $M_{YY}^{A(2),DEL}(1)'$ |
| 020 | BBBBBB | 2 | YY | NULL | 015 | D | | ADD | X | $M_{YY}^{B(2),ADD}(3)'$ |
| 021 | AAAAAA | 2 | ZZ | NULL | 018 | V | | SPLIT | X | $M_{ZZ}^{A(2),SPLIT}(2)'$ |
| 022 | AAAAAA | 2 | YY | NULL | 019 | D | | TTY | T | $M_{YY}^{A(2),TTY}(2)'$ |
| 023 | AAAAAA | 2 | YY | NULL | 017 | N | | NDC | N | $M_{YY}^{A(2),NDC}(3)'$ |
| 024 | AAAAAA | 10 | YY | U | ? | NULL | NULL | NULL | NULL |
| 025 | AAAAAA | 10 | YY | NULL | 024 | D | | TTY | T | $M_{YY}^{A(10),TTY}(1)'$ |
| 026 | AAAAAA | 10 | YY | NULL | 025 | D | | SPLIT | X | $M_{YY}^{A(10),SPLIT}(2)'$ |

FIG. 11

Table IV. Dependency maps after sending first messages of message envelope 2.

| ID | P | I | J | RD_STAT | D_ID | D_STAT | N | TYPE | Message |
|---|---|---|---|---|---|---|---|---|---|
| 001 | AAAAAA | 0 | YY | S | NULL | NULL | NULL | NULL | NULL |
| 002 | BBBBBB | 0 | ZZ | S | NULL | NULL | NULL | NULL | NULL |
| 003 | AAAAAA | 0 | YY | NULL | 001 | S | TTY | T | $M_{YY}^{A(0),TTY}(1)'$ |
| 004 | AAAAAA | 1 | ZZ | S | 001 | NULL | NULL | NULL | NULL |
| 005 | AAAAAA | 1 | ZZ | NULL | 004 | S | DEL | X | $M_{ZZ}^{A(1),DEL}(1)'$ |
| 006 | BBBBBB | 0 | ZZ | NULL | 002 | V | TTY | T | $M_{ZZ}^{B(0),TTY}(1)'$ |
| 007 | AAAAAA | 1 | ZZ | NULL | 005 | S | TTY | T | $M_{ZZ}^{A(1),TTY}(2)'$ |
| 008 | BBBBBB | 0 | ZZ | NULL | 006 | S | ADD | X | $M_{ZZ}^{B(0),ADD}(2)'$ |
| 009 | BBBBBB | 1 | YY | S | 002 | NULL | NULL | NULL | NULL |
| 010 | BBBBBB | 1 | YY | NULL | 009 | S | TTY | Y | $M_{ZZ}^{B(1),TTY}(1)'$ |
| 011 | AAAAAA | 1 | YY | S | 001 | NULL | NULL | NULL | NULL |
| 012 | AAAAAA | 1 | YY | NULL | 011 | S | ADD | X | $M_{YY}^{A(1),XML}(1)'$ |
| 013 | BBBBBB | 2 | YY | N | 009 | NULL | NULL | NULL | NULL |
| 014 | BBBBBB | 2 | YY | NULL | 013 | S | DEL | X | $M_{YY}^{B(2),DEL}(1)'$ |
| 015 | BBBBBB | 2 | YY | NULL | 014 | N | TTY | T | $M_{YY}^{B(2),TTY}(2)'$ |
| 016 | AAAAAA | 2 | ZZ | S | 004 | NULL | NULL | NULL | NULL |
| 017 | AAAAAA | 2 | YY | N | 011 | NULL | NULL | NULL | NULL |
| 018 | AAAAAA | 2 | ZZ | NULL | 007 | S | TTY | T | $M_{ZZ}^{A(2),TTY}(1)'$ |
| 019 | AAAAAA | 2 | YY | NULL | 017 | S | DEL | X | $M_{YY}^{A(2),DEL}(1)'$ |
| 020 | BBBBBB | 2 | YY | NULL | 015 | D | ADD | X | $M_{YY}^{B(2),ADD}(3)'$ |
| 021 | AAAAAA | 2 | ZZ | NULL | 018 | V | SPLIT | X | $M_{ZZ}^{A(2),SPLIT}(2)'$ |
| 022 | AAAAAA | 2 | YY | NULL | 019 | N | TTY | T | $M_{YY}^{A(2),TTY}(2)'$ |
| 023 | AAAAAA | 2 | YY | NULL | 017 | S | NDC | N | $M_{YY}^{A(2),NDC}(3)'$ |
| 024 | AAAAAA | 10 | YY | U | ? | NULL | NULL | NULL | NULL |
| 025 | AAAAAA | 10 | YY | NULL | 024 | D | TTY | T | $M_{YY}^{A(10),TTY}(1)'$ |
| 26 | AAAAAA | 10 | YY | NULL | 025 | D | SPLIT | X | $M_{YY}^{A(10),SPLIT}(2)'$ |

FIG. 12

Table V. Dependency maps after sending all messages of message envelope 2.

| ID | P | I | J | RD_STAT | D_ID | D_STAT | N | TYPE | Message |
|---|---|---|---|---|---|---|---|---|---|
| 001 | AAAAAA | 0 | YY | S | NULL | NULL | NULL | NULL | NULL |
| 002 | BBBBBB | 0 | ZZ | S | NULL | NULL | NULL | NULL | NULL |
| 003 | AAAAAA | 0 | YY | NULL | 001 | S | | TTY | $M_{YY}^{A(0),TTY}(1)'$ |
| 004 | AAAAAA | 1 | ZZ | S | 001 | NULL | NULL | NULL | NULL |
| 005 | AAAAAA | 1 | ZZ | NULL | 004 | S | | DEL | X | $M_{ZZ}^{A(1),DEL}(1)'$ |
| 006 | BBBBBB | 0 | ZZ | NULL | 002 | V | | TTY | T | $M_{ZZ}^{B(0),TTY}(1)'$ |
| 007 | AAAAAA | 1 | ZZ | NULL | 005 | S | | TTY | T | $M_{ZZ}^{A(1),TTY}(2)'$ |
| 008 | BBBBBB | 0 | ZZ | NULL | 006 | S | | ADD | X | $M_{ZZ}^{B(0),ADD}(2)'$ |
| 009 | BBBBBB | 1 | YY | S | 002 | NULL | NULL | NULL | NULL |
| 010 | BBBBBB | 1 | YY | NULL | 009 | S | | TTY | Y | $M_{ZZ}^{B(1),TTY}(1)'$ |
| 011 | AAAAAA | 1 | YY | S | 001 | NULL | NULL | NULL | NULL |
| 012 | AAAAAA | 1 | YY | NULL | 011 | S | | ADD | X | $M_{YY}^{A(1),XEC}(1)'$ |
| 013 | BBBBBB | 2 | YY | N (S) | 009 | NULL | NULL | NULL | NULL |
| 014 | BBBBBB | 2 | YY | NULL | 013 | S | | DEL | X | $M_{YY}^{B(2),DEL}(1)'$ |
| 015 | BBBBBB | 2 | YY | NULL | 014 | S | | TTY | T | $M_{YY}^{B(2),TTY}(2)'$ |
| 016 | AAAAAA | 2 | ZZ | S | 004 | NULL | NULL | NULL | NULL |
| 017 | AAAAAA | 2 | YY | S | 011 | NULL | NULL | NULL | NULL |
| 018 | AAAAAA | 2 | ZZ | NULL | 005 | S | | TTY | T | $M_{ZZ}^{A(2),TTY}(1)'$ |
| 019 | AAAAAA | 2 | YY | NULL | 017 | S | | DEL | X | $M_{YY}^{A(2),DEL}(1)'$ |
| 020 | BBBBBB | 2 | YY | NULL | 015 | N (S) | ADD | X | $M_{YY}^{B(2),ADD}(3)'$ |
| 021 | AAAAAA | 2 | ZZ | NULL | 018 | V | | SPLIT | X | $M_{ZZ}^{A(2),SPLIT}(2)'$ |
| 022 | AAAAAA | 2 | YY | NULL | 019 | S | | TTY | T | $M_{YY}^{A(2),TTY}(2)'$ |
| 023 | AAAAAA | 2 | YY | NULL | 017 | S | | NDC | N | $M_{YY}^{A(2),NDC}(3)'$ |
| 024 | AAAAAA | 10 | YY | U | ? | NULL | NULL | NULL | NULL |
| 025 | AAAAAA | 10 | YY | NULL | 024 | D | | TTY | T | $M_{YY}^{A(10),TTY}(1)'$ |
| 026 | AAAAAA | 10 | YY | NULL | 025 | D | | SPLIT | X | $M_{YY}^{A(10),SPLIT}(2)'$ |

FIG. 13

MULTI-STANDARD MESSAGE PROCESSING

TECHNICAL FIELD

The present invention generally relates to message processing and, more particularly, to processing messages observing dependencies between messages and message order.

BACKGROUND

Various message processing systems are known in the prior art. Furthermore, certain message standards are known such as teletype or, briefly, TTY messages.

SUMMARY

A message processing system is provided that is capable of processing messages according to a legacy format and processing messages according to a successor of the legacy format, i.e., a new format, while ensuring that messages according to both formats are sent to receivers in the correct message order. The message processing system may process XML-based messages according to the NDC standard and a legacy format, such as TTY, in a unified manner.

The "New Distribution Capability" standard, briefly referred to the NDC standard, was delivered by the International Air Transport Association (IATA) in 2015. NDC is an airline distribution format for the development and market adoption of a XML-based data transmission standard between airlines and global distribution systems (GDS). For example, NDC enables airlines to respond directly to shopping requests from travel agents, to manage order processing and enables true comparison shopping. NDC is not a system or a software or a database, but a standard to exchange information between airlines and travel agents.

NDC allows that one database change commit triggers multiple messages to one message target. These messages may be of different types, may be sent to different sending methods and may have a certain dependency and causality. The message system may support NDC message flows and, at the same time, is backward compatible in supporting legacy message systems with simpler functionalities, so that both types of message flows are supported in an integrated and unified manner, as opposed to two independent message systems.

Furthermore, the message system may be open and extensible and may thus support future message standards that may support even a wider range of functionalities than the NDC standard.

According to a first aspect, a method is provided to process messages in a distributed messaging system by a message processing engine. At least one message target of the plurality of message targets operates according to a first standard and at least one message target of the plurality of message targets operates according to a second legacy standard. The method is performed by a message processing engine. A plurality of database commit indications is received, wherein each database commit indication indicates a change of a database record. In response to receiving a database commit indication of the plurality of database commit indications, a message envelope is generated for each message target to be notified operating according to the first standard and at least one message within each message envelope is generated. Message envelope dependencies between generated message envelopes for a same message target are computed. The message envelope dependencies define an order of the message envelopes for the same message target. Message dependencies between the messages within each message envelope are computed based at least on the standard of the messages of the respective message envelope and functions of the messages. The message dependencies define an order of the messages within each message envelope. The messages are sent to the respective message target in a sequence based on the message envelope dependencies and the message dependencies.

According to a second aspect, a message system is provided which is arranged to implement the method above.

According to a third aspect, a computer program product is provided which implements the method above when being executed on a computer.

The above summary may present a simplified overview of some embodiments of the invention in order to provide a basic understanding of certain aspects the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

Embodiments of the present invention will be understood and appreciated more fully from the following detailed description taken in conjunction with the drawings. Similar reference numbers generally indicate identical or functionally similar elements.

FIGS. 11, 12 and 13 show different states of a table maintaining message envelopes and messages and dependencies between the message envelopes and messages.

DETAILED DESCRIPTION

Figure 1:
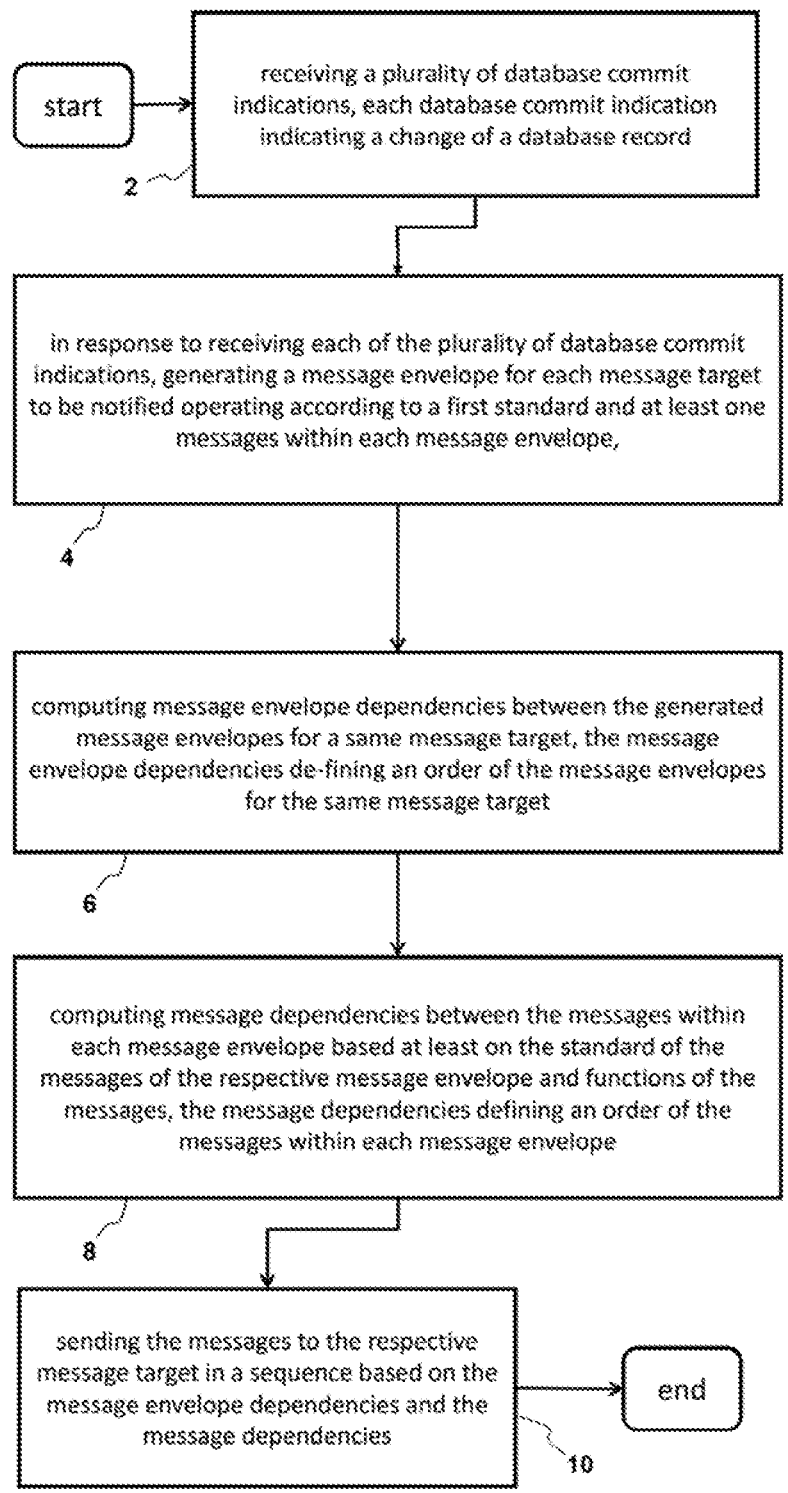
FIGS. 1, 2, 3 and 4 are flow charts for functional-level message processing methods as described herein.

Before explaining a more specific implementation example with respect to FIGS. 6 to 14, a few more general aspects will be discussed first with reference to FIGS. 1 to 5.

Generally, the order of messages to be sent to message targets is one aspect to be addressed in message processing system. For example, a correct order of reservation messages is to be maintained for information flows in a GDS. For example, a booking (reservation) at a database of a reservation system is modified in one or several change commits. A receiver is supposed to receive corresponding notifications of the booking modification in form of message exchange, namely of those change commits in order, in order to maintain system-wide data consistency. If the order of the change commits is changed, a discrepancy or inconsistency between the records among GDS instances and/or airline systems would occur. For example, a travel agency effects a flight cancellation and then rebooks the same flight on a different date, in two subsequent change commits. The customer, i.e., the airline, needs to receive a cancel message first, and only then a message for the flight rebook, in order to have a correct synchronization. Therefore, a correct message sequence to the message target guarantees that the reservation is kept consistent between a booking source and a booking target, in order to avoid possible record discrepancy.

In today's messaging flows such as GDS reservation synchronization flows, usually—for one message target—at most one TTY message per change commit of the booking record is generated (so called an envelope of end-of-transactions for a passenger name record, aka PNR), for exchanging modifications between GDS nodes. A dedicated method for a traditional TTY framework has been proposed by EP 2254046 B1. However, in the context of NDC reservations, the scenario is changing because implementations of the NDC standards are envisaged to usually trigger multiple messages for one reservation record change commit to message targets that operate in accordance with the NDC specification and thus implement NDC features. Those multiple messages may have different message types (TTY, XML, or even future other types), different message functions (such as add or delete messages), sending methods (synchronous: the message is sent and a confirmation response is received in the same session, then session is closed after message delivery is known to be successful; or asynchronous: the session is closed at the sender side the message is sent, the confirmation response is sent back to the sender via another session), they may employ various transmission and network protocols (such as HTTP/SOAP) and also sending priorities which defines relations between the messages. Also, legacy TTY message flows are still to be maintained by the message processing systems, i.e., the message processing systems have to be backward compatible as TTY flows and NDC flows will co-exist for synchronizing reservation records. In order to achieve robustness, backward compatibility and maintain stability, a new message processing mechanism is thus sought.

To summarize, this new message processing mechanism is to address the problem of message sequences in context of NDC reservations where multiple messages are triggered for one change commit which have a dependency relation to each other and thus need to be sent to message target in a well-defined order. The new message processing is also to address the problem to integrate NDC message flows and legacy TTY flows into one generic message processing framework that synchronizes booking record in a hybrid mode where TTY, XML and other message types are used.

To address these problems, it is proposed to process messages and manage message orders in an integrated manner, as opposed to handling legacy message flows and NDC message flows by two separate and independent message processing systems. With reference to FIG. 1, messages are processed in a distributed messaging system by a message processing engine. The distributed messaging system includes multiple types of message targets. At least one message target of the plurality of message targets operates according to a first standard and at least one message target of the plurality of message targets operates according to a second legacy standard. The term message target as used herein includes message destinations at various levels, including large systems such as a Global Distribution System (GDS), a Departure Control System (DCS), a wide area network (WAN) or local area network (LAN) of a certain organization such as an airline, as well as individual receiver stations.

In some embodiments, message targets operating according to the first standard are fully backward compatible and thus also operate according to the second standard, i.e., are arranged to also process messages in accordance with the second standard, while message targets operating according to the second standard are legacy message targets which do not implement the first standard and thus are unable to process messages according to the second standard. Thus, generally, reference to the first standard mentioned herein in fact encompasses the first standard and the second standard and respective messages according to the first standard and the second standard, while reference to the second standard mentioned herein only encompasses message targets and messages according to the second standard.

Again referring to FIG. 1, at block 2, a plurality of database commit indications is received by the message processing engine. Each database commit indication indicates a change of a database record. A database commit indication is a container of all changes done to a database record such as a Passenger Name Record (PNR) between a retrieval query and a database commit finalizing the changes to the database record in the database located upstream to the message processing engine. Hence, each time a change is committed in the upstream database, a database change commit indication is generated and published to the message processing engine. Database commit indications are thus the input to the message processing engine.

In response to receiving a database commit indication of the plurality of database commit indications, a message envelope is generated for each message target to be notified which operates according to the first standard and at least one message within each message envelope is generated at block 4. A message envelope as used herein is considered as a special instance of a message that is not sent out but constitutes a reference grouping messages of a message envelope. This is similar to file systems where a directory or folder is a special instance of a file grouping all file located in the directory. The set of a message envelope and its messages is also referred to as a message list hereinafter.

Generally, the message processing engine determines the message targets that are affected by a received database commit indication and generates a message envelope for each affected message target that is to be notified which operates according to the first standard. All messages within a message envelope are addressed to this message target and will be sent to the message target in a well-defined order. In order to determine and ensure the order of sending, dependencies at two different levels are introduced herein, namely a message envelope dependency at the level of message envelopes and a message level dependency at the message level. Message envelope dependencies define an order among all message envelopes generated for a certain message target. Message dependencies define an order of the message within a certain message envelope.

Hence, the generation of message envelopes and messages within the message envelopes also involves a computation of message envelope dependencies between the generated message envelopes for a same message target at block 6 and of message dependencies between the messages within each message envelope at block 8.

Generally, a message envelope created for a database commit indication is computed to be dependent on other message envelopes already existing for the same message target at block 6, i.e., message envelopes that have already been generated previously for that message target in response to the reception of an earlier database commit message. Hence, the message envelopes for a certain message target are ordered based on the reception order of database commit messages affecting the certain message target.

On the other hand, message dependencies are computed at block 8 based at least on the standard of the messages of the respective message envelope and functions of the messages. In particular messages of the first standard can be classified into different functions (also referred to as "message name" below) such as add messages adding a record, delete messages deleting a record, split messages splitting a record, and others.

The relations established between specific message envelopes and messages valid at a certain point of time are also referred to as a message dependency map. Message dependency maps are maintained by the message processing engine in one or more database tables. The messages are sent by the message processing engine to the respective message target at block 10 in a sequence based on the message envelope dependencies and the message dependencies.

In addition to the different types of message targets, different types of database systems generating the database commit indications may be present in the distributed messaging system. One type of database system operates according to the first (new) standard and may output database commit indications already in compliance with the first standard (and for reasons of backward compatibility also database commit indications in compliance with the second standard). Another type of database system still operates in accordance with the second legacy standard only and thus outputs legacy database commit indications only.

Depending on the source of a database commit message (a database system operating according to the first standard or a database system operation according to the second legacy standard) and depending on the type of message target to be notified (a message target operating according to the first standard or a message target operating according to the second legacy standard), different cases of message processing can be differentiated.

Figure 2:
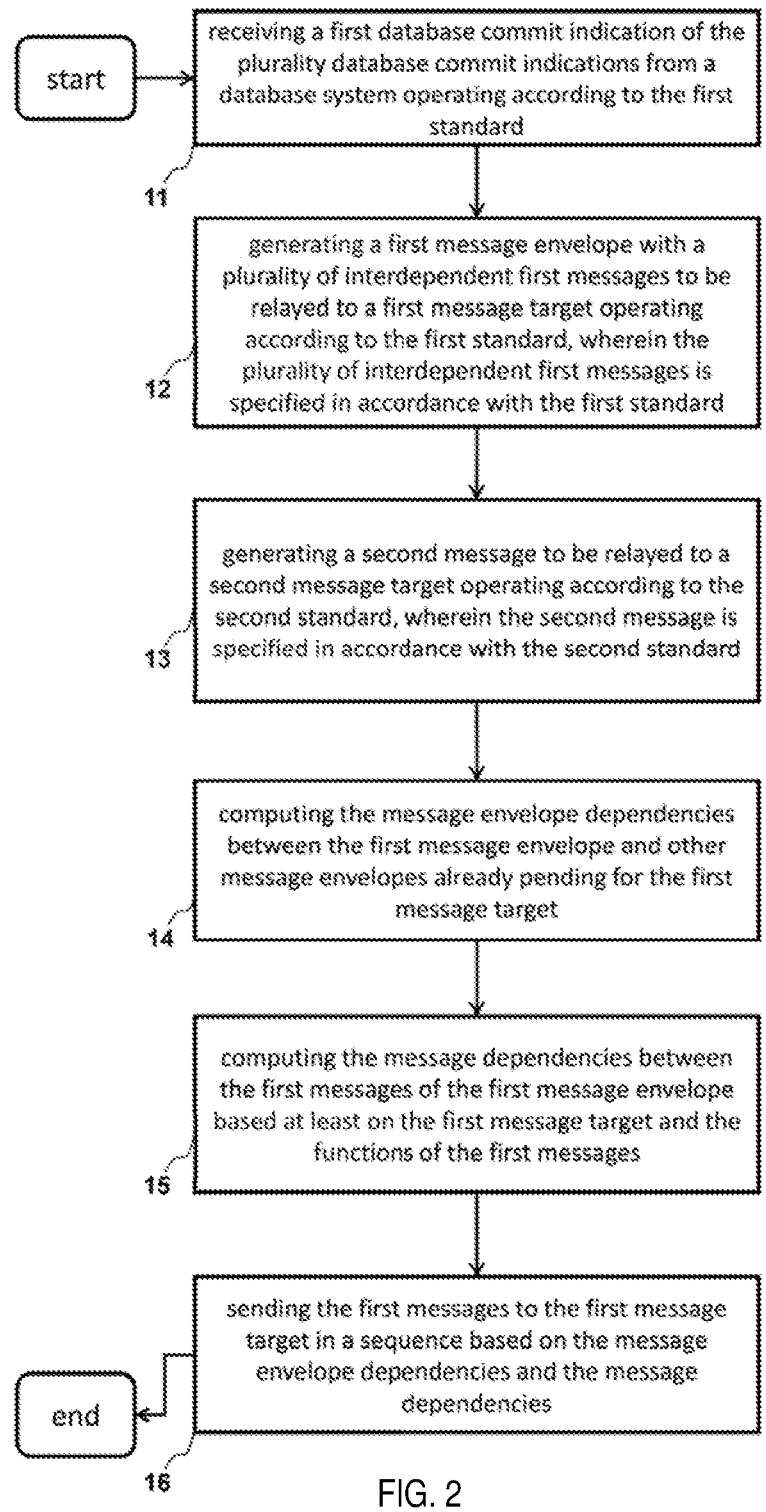

With reference to FIG. 2, a first case assumes that a database commit indication received at block 11 is a first database commit indication of the plurality database commit indications from a database system operating according to the first standard. In some embodiments, this database commit indication is marked as a database commit indication according to the first standard, e.g., by a flag as explained further below. In response to receiving the database commit indication according to the first standard, the message processing engine generates a message envelope for each message target operating according to the first standard to be notified and generates at least one message within each message envelope.

Here, two different sub-cases can be distinguished. For each message target to be notified implementing the first standard, briefly referred to as first message targets, a respective first message envelope is generated at block 12, each of which usually includes a plurality of interdependent first messages to be relayed to the respective first message target operating according to the first standard. The plurality of interdependent first messages is specified in accordance with the first standard (which generally also encompasses messages according to the second messages according to the second standard for reasons of backward compatibility as already explained above). For each message target to be notified implementing the second legacy standard, briefly referred to as second message targets, a (one per message target) second message to be relayed to the second message target operating according to the second standard is generated at block 13. The second message is specified in accordance with the second legacy standard.

The message processing engine then computes the message envelope dependencies between the first message envelope and other message envelopes already pending for the first message target at block 14. The envelope dependencies define the order of the message envelopes for the first message target.

The message processing engine further computes the message dependencies between the first messages of the first message envelope based at least on the first message target and the functions of the first messages at block 15. The message dependencies define the order of the messages within each message envelope.

The first messages are then sent to the first message target at block 16 in a sequence based on the message envelope dependencies and the message dependencies.

With respect to the second messages generated for message targets implementing the second legacy standard, these messages are either sent out directly if no other message is pending for the message target concerned or a message level dependency is computed if other pending messages for the message target concerned are pending. In the latter case, second messages are sent out in a sequence in accordance with the message level dependency computer.

Figure 3:
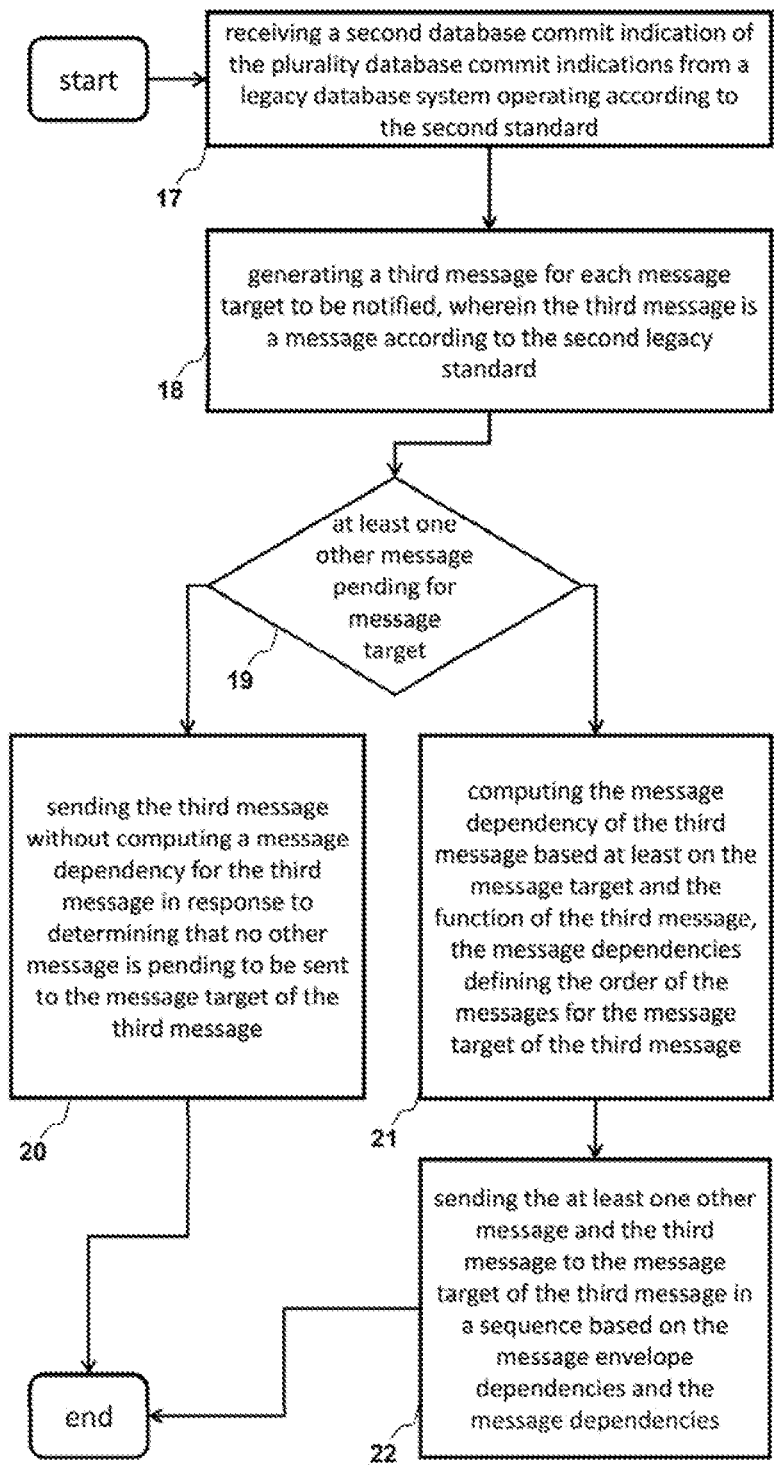

With reference to FIG. 3, a second case assumes that a database commit indication received at block 17 is a second database commit indication of the plurality of database commit indications from a database system operating according to the second legacy standard. In some embodiments, this database commit indication does not include a marking indicating the first standard and the message processing system thus recognizes the database commit indication to be an indication according to the second legacy standard.

In response to receiving a second database commit indication of the plurality of database commit indications from a legacy database system operating according to the second standard, the message processing engine generates, at block 18, one message for each message target to be notified and potentially associates the message for each message target with an existing message envelope for the respective target, provided that at least one message envelope for the message target has been generated in the past and is still pending. Generally, since the second database commit message is according to the second legacy standard, only respective messages according to the second legacy standards are generated by the message processing engine. In other words, a database commit indication according to the second legacy standard does neither causes a generation of message envelopes nor a generation of messages according to the first standard.

For both message targets operating according to the first standard and message targets operating according to the second legacy standard, the message processing engine generates one message formatted according to the second standard, hereinafter referred to as third message. For each message target without any pending message envelopes and/or messages, as determined at block 19, the generated third message according to the second standard is sent immediately at block 20, without any message dependency calculation.

For message targets with a pending message envelope and/or at least one pending message, as determined at block 19, the generated message according to the second legacy standard is generally associated with the pending message envelope or, if no message envelope is pending, included in the sequence of pending messages. In this case, at block 21, the message processing engine computes a message dependency of the third message based at least on the first message target and the fact that the third message is a message according to the second legacy standard. The computed message dependency defines the location of the third message in the sequence of the other messages of the pending message envelope for the message target considered.

For example, if the message target considered operates according to the first standard, i.e., it is a first message target, a first envelope with first messages may already be pending. In this case, the third message is generally included in the message envelope and a message dependency is computed relating the first messages with the third message. At block 22, the first messages and the third message are sent to the first message target in a sequence based on the message envelope dependencies and the message dependencies.

In some particular cases, e.g., if the third message is attributed with the highest priority relative to all other messages in the first message envelope, no message dependency is computed as the third message can be and is sent out directly.

Figure 4:
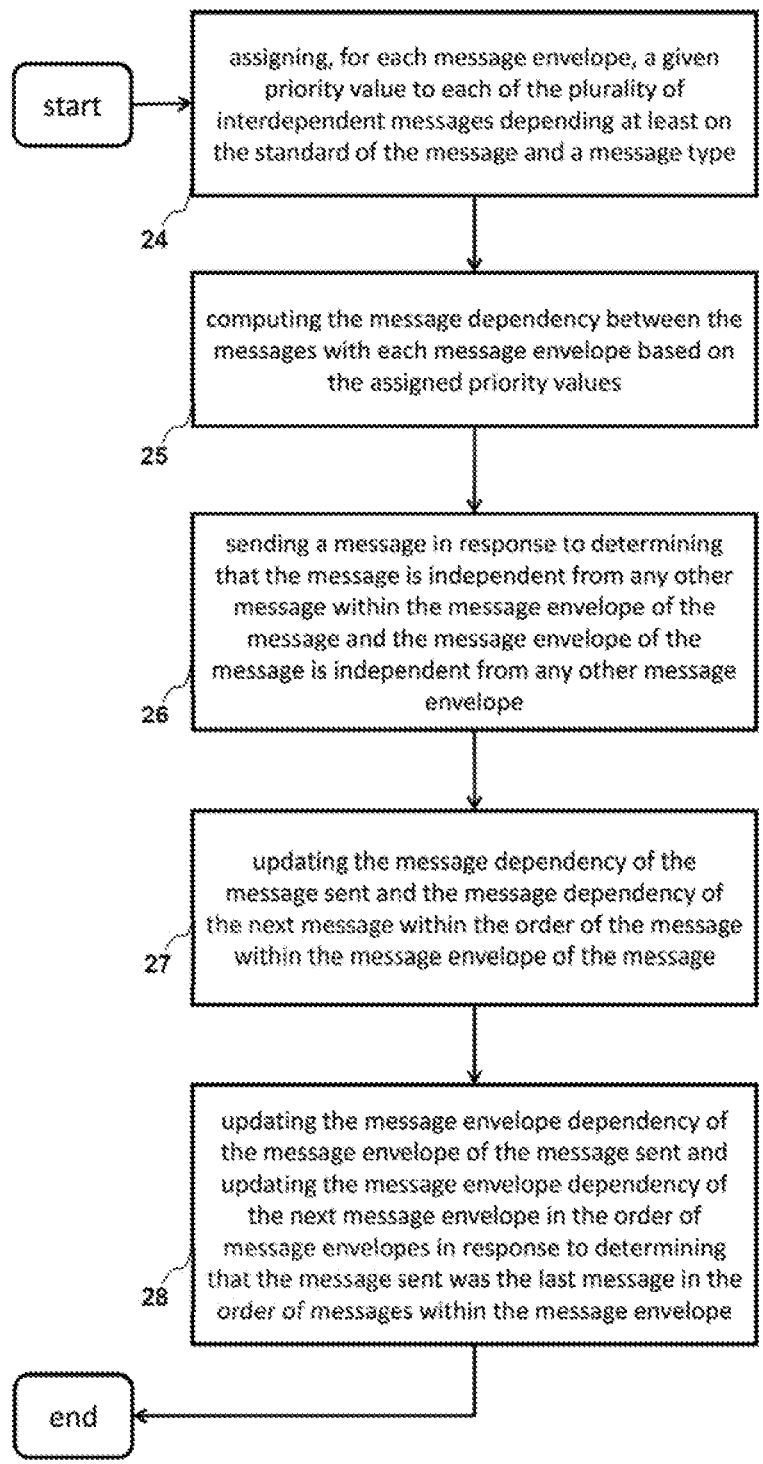

With reference to FIG. 4, optionally, a given priority value is assigned at block 24 to each of the plurality of interdependent messages depending at least on the standard of the message and a message type. The message dependency between the messages with each message envelope is computed at block 25 based on the assigned priority values. An example of a table defining priority values will be given further below.

Optionally, at block 26, a message is sent in response to determining that the message is independent from any other message within the message envelope of the message and the message envelope of the message is independent from any other message envelope. Further, optionally, the message dependency of the message sent and the message dependency of the next message within the order of the message within the message envelope of the message are updated at block 27. As will be explained in more detail below, this update might render the next message in the message envelope, if any, independent and thus ready to be sent.

If the last message sent was the last message of the current message envelope, the message envelope dependency of the message envelope of the last message sent is updated and also the message envelope dependency of the next message envelope in the order of message envelopes is updated. This update at block 28 renders the message envelope of the last message sent to be completely processed and the next message envelope to be independent and, consequently, the first message of the next message envelope to be independent as well and thus ready to be sent.

Optionally, the first standard is compliant with the New Distribution Capability (NDC) of the IATA.

In some embodiments, the methodologies described herein extend e.g., a GDS reservation synchronization system from legacy TTY messages to a set of hybrid messages: TTY messages, XML messages and potentially other messages.

Figure 5:
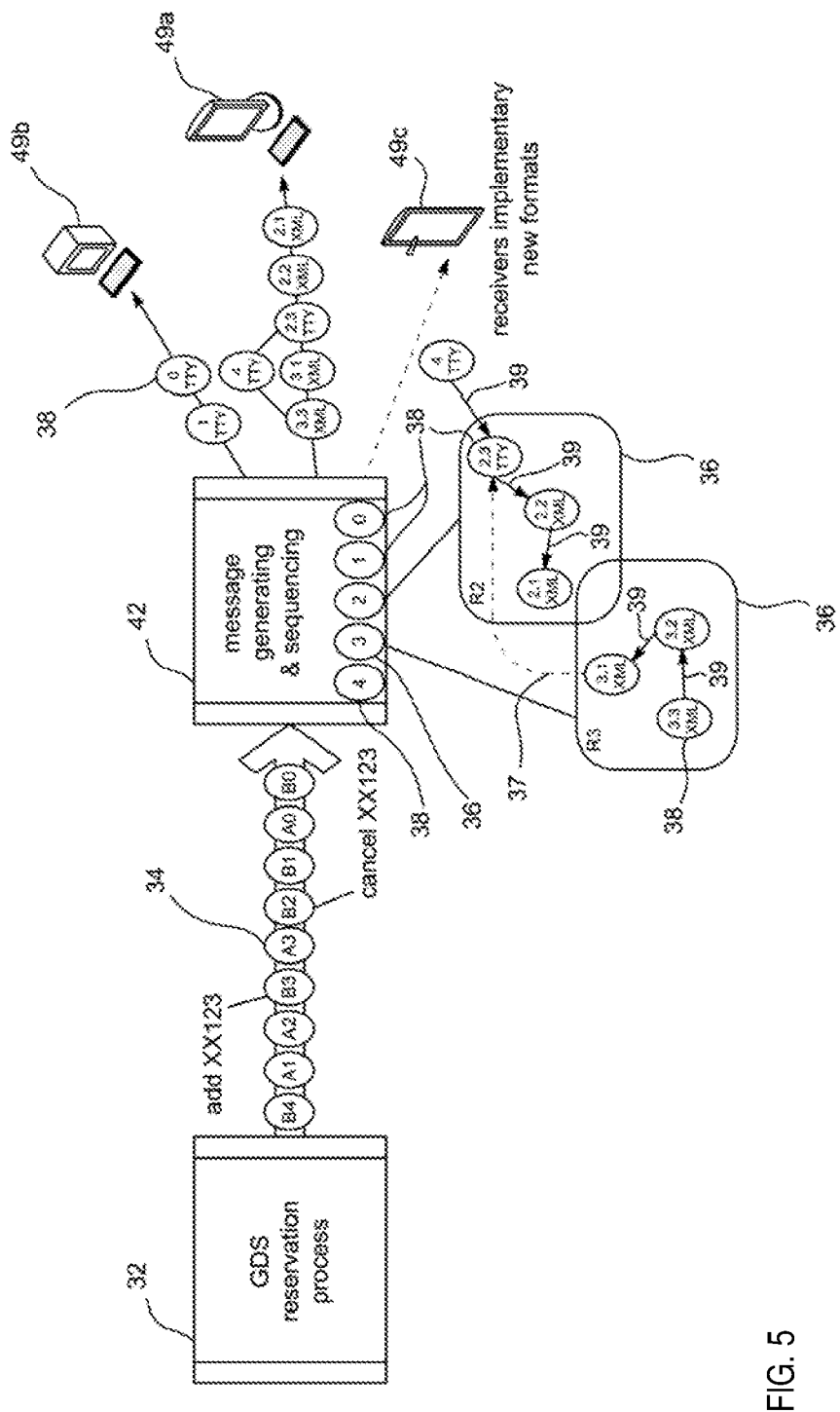
FIG. 5 visualizes dependencies at message envelope level and at message level as defined by the message processing systems described herein.

FIG. 5 shows a high level view of message processing. As an example, an air segment "cancel-rebook" scenario happened in the change commit indications 34 of the reservation record B. Change commit indications B2 and B3 are received by a message generating and sequencing process 42 from a GDS reservation process 32. Change commit indication B2 indicates a cancellation of flight segment XX123 for reservation record B, change commit indication B3 indicates an addition of flight segment XX123 to the reservation record B. The message generating and sequencing process 42 also receives change commits 34 for other reservation records kept by the GDS reservation process 32, such as change commits A0, A1, A2, and A3 relating to another reservation record A.

Ideally, change commit indications 34 are output by the GDS reservation process 32 in an ordered manner. However, this may not be always be the case, as exemplarily shown for the change commits related to reservation record A which are sent by the GDS reservation process 32 in the order A0, A3, A2, A1. For example, GDS reservation process 32 may actually originate from two different database systems, namely a database system operating according to the first standard (e.g., managing reservation record B) and another database system operating according to the second legacy standard (e.g., managing reservation record A), as explained above.

In response to receiving the change commit indications 34 of the exemplary "cancel-rebook" flow concerning reservation record B (along with other change commits 34 related to other reservation records), the message generating and sequencing process 42 recognizes that these change commit indications 34 of the exemplary "cancel-rebook" flow concerning reservation record B are change commits according to a state-of-the-art standard such as the NDC standard (i.e., the first standard as opposed to the second legacy standard). For example, the change commit indications 34 of the exemplary "cancel-rebook" flow concerning reservation record B contain a special indicator identifying them as NDC change commit indications.

In response to recognizing a change commit indication 34 to be an NDC change commit, the message generating and sequencing process 42 creates a message envelope 36 for each message target to be notified, here message target 49a operating in accordance with the first standard such as NDC, and one or multiple messages 38 belonging to the message envelope 36. The message envelope groups the one or multiple messages relating to the recognized NDC change commit 34 and that are to be sent to the message target 49a. Furthermore, the message generating and sequencing process 42 establishes dependencies at two levels, namely at a message envelope level as well as at a message level. The dependencies at both levels are also referred to as a dependency map hereinafter.

The purpose of creating a message envelope 36 is to manage and determine whether and when messages of this message envelope can be sent, i.e., whether the messages of a message envelope 36 have no dependencies to other messages 38 that are generated for other change commits 34. In that sense, from a functional point of view, a message envelope 36 constitutes a reference node for all the messages 38 belonging to that message envelope 36 (message envelopes are therefore also abbreviated by "R" hereinafter).

A newly created message envelope 36 is included in a potentially already existing message envelope level dependency map if one or more other message envelopes 36 for the reservation record concerned is/are already present for the message target 49a concerned. In the example of FIG. 3, change commit indication B2 indicating the cancellation of flight segment XX123 is received by the message generating and sequencing process 42. The message generating and sequencing process 42 determines that message target 49*a* is to be notified and creates message envelope R2 and three messages 2.1 XML, 2.2 XML and 2.3 TTY belonging to the message envelope R2.

Next, change commit indication B3 is received. The message generating and sequencing process 42 again determines that message target 49*a* is to be notified and creates a further message envelope R3 with a set of messages 3.1 XML, 3.2 XML and 3.3 XML. A dependency between message envelopes R2 and R3 is established in that message envelope R3 depends on message envelope R2, as indicated by dotted arrow 37.

In addition, inside the message envelope 36, messages 38 are put in order as well, i.e., a message level dependency map is established. In the example of FIG. 5, the message order inside message envelope R2 is 2.1 XML, 2.2 XML and 2.3 TTY and the message order inside message envelope R3 is 3.1 XML, 3.2 XML and 3.3 XML, as indicated by arrows 39. In some embodiments, the message level dependency maps are established based on predefined message priority values, so that the messages with higher priority values located upstream in the message dependency map instead of messages with lower priority values.

Next, the message generating and sequencing process 42 receives the change commit indication B4 again related to reservation record B. Change commit indication B4 originates from a legacy reservation system and the message generating and sequencing process 42 determines that again message target 49*a* operating according to the first standard is to be notified. Thus, the message generating and sequencing process 42 generates a TTY message, message 4 TTY, and sorts it into the existing dependency map in accordance with the TTY framework mechanisms described by EP 2254046 B1. In the example of FIG. 5, a message level dependency is computed for message 4 TTY so that message 4 TTY depends on message 2.3 TTY (for reasons of presentation, it is assumed here that message 2.3 TTY could not have been sent yet, e.g., because other previous TTY messages related to reservation record B not shown in FIG. 5 are still pending for message target 49*a*).

The dependency maps at the message envelope level and at the message level control the sequence of sending the messages to message targets 49. Generally, messages of a particular message envelope 36 are only sent to message targets 49 if the particular message envelope 36 does not depend on other message envelopes 36. Hence, in the example of FIG. 5, messages 3.1 XML, 3.2 XML and 3.3 XML of message envelope R3 are only sent after message envelope R2 has been processed completely, i.e., all messages of message envelope R2 have been successfully sent to the message target 49*a*. Inside a message envelope, the sending order of the messages is determined by the message level dependency. In the example of FIG. 5, the message sending order within message envelope R2 is message 2.1 XML first, then message 2.2 XML and message 2.3 TTY at last. For message envelope R3, the message sending order is message 3.1 XML first, then message 3.2 XML and message 3.3 XML last. Message 4 TTY can be sent after message 2.3 TTY has been successfully been transmitted, i.e., message 4 TTY is sent in parallel to message 3.1 XML.

Change commit indications 34 received from a legacy database system are generally converted into messages according to the second legacy standard only, in the example of FIG. 5 into TTY messages. In the event that no previous message is pending for a given message target concerned, these messages can be sent out immediately without computing a message envelope level dependency and message level dependency. In the example of FIG. 5, reservation record A is maintained by a legacy database system and, thus, change commit indications A0, A1, A2 and A3 are only converted into TTY messages. For example, in response to receiving change commit indication A0, the message generating and sequencing process 42 determines that message target 49*b* (which is a message target operating according to the second legacy standard) is to be notified and generates message 0 TTY which is then sent immediately since no other message is pending for message target 49*b*. Likewise, change commit indication A1 triggers a generation of the message 1 TTY which is again sent immediately without computing a message level dependency, assuming that message 0 TTY has already been successfully delivered to the message target 49*b*.

Generally, a message is determined to be eligible for being sent and to be passed to a message sending queue in response to determining that the message does not depend on the successful delivery of another message, wherein this dependency is defined by the dependency maps at the message envelope level and at the message level. If a successful delivery of a particular message is recognized, e.g., by receiving a receipt confirmation response from the message target 49, the dependency status of this particular message is updated by the message processing system. In response to this dependency status update, the dependency status of other messages depending on the particular message is then updated from "dependent" to "independent" with the effect that sending these other messages is initiated next. In response to determining that the last message in the message level dependency map of a particular message envelope 36 has been successfully delivered to the message target 49, i.e., all messages of the particular message envelope 36 have been sent, the particular message envelope 36 is considered to be completely processed and the dependency status at the message envelope level of the next message envelope depending on the particular message envelope 36 is updated from "dependent" to "independent". This renders the first message of message level dependency map of the next message envelope to be ready for sending and sending this first message of the next message envelope is initiated. This whole process continues in the same manner until all message of the message envelope have been sent to their message targets.

TTY and XML used above are examples for different types of messages in accordance with different message standards. TTY is an example for a legacy standard employing one or more legacy message subtypes. XML is an example for a new-generation standard employing a plurality of message subtypes e.g., for different database manipulation functions. Usually, the different message types are generated for different types of message targets, namely message targets that implement the different message standards. The example of FIG. 5 shows two specific types of message targets, namely TTY message targets 49*b* implementing the legacy standard only (i.e., not the new-generation standard) and XML message targets 49*a* implementing the new-generation standard such as the NDC standard (as explained above, the XML message target 49*a* might potentially be backward compatible and thus capable of processing legacy messages as well).

The present message processing system is not limited to processing messages of two message standards, but is extensible and generally suitable for processing messages according to one or more further standards and types for message targets 49*c* implementing such new standards. The concept of establishing dependencies at message envelope level and at message level can be utilized to handle any other new message standards and types, for example by assigning priority values to messages of the new standard/type that define a relation of the messages of the new standard/type to messages of the existing standards/types.

Now turning to the more specific part of the description, a particular implementation example of the general message processing mechanisms explained above will be described next with reference to FIGS. 6 to 14.

Figure 6:
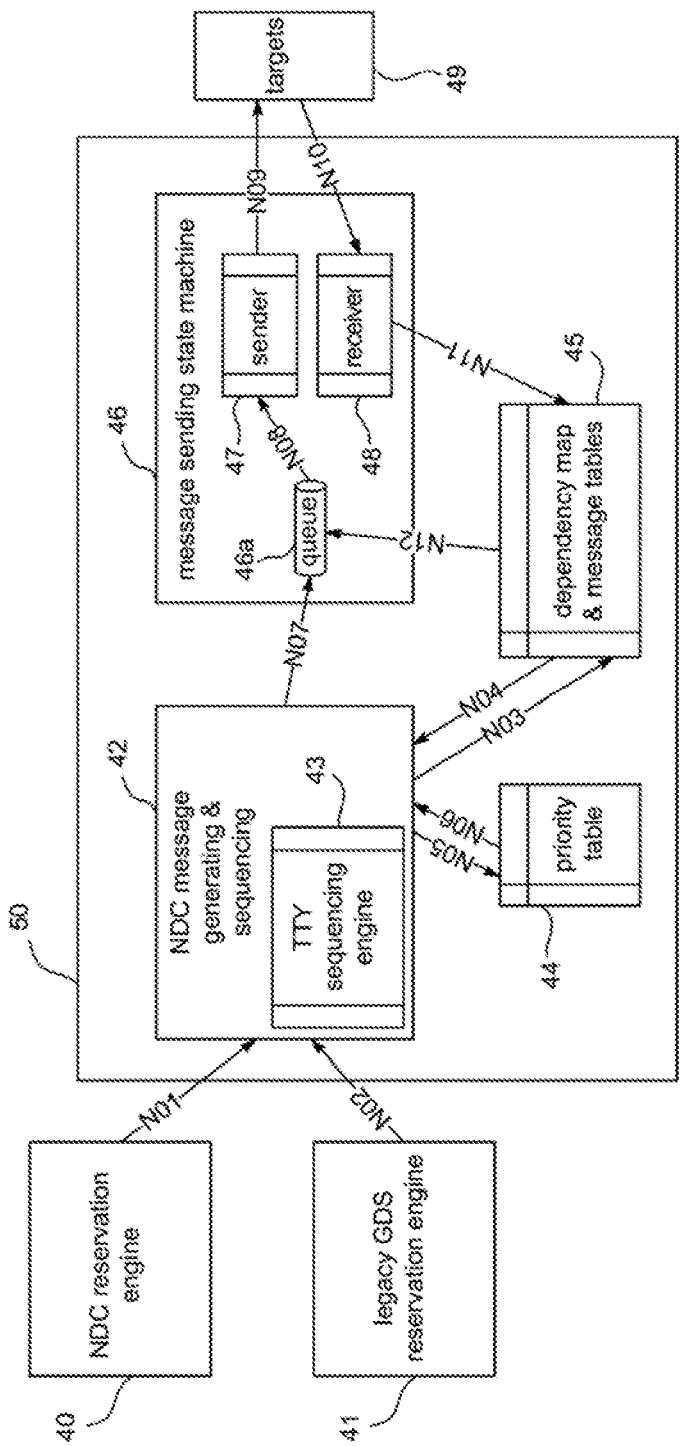
FIG. 6 is an exemplary process-oriented view of the message processing system.

FIG. 6 shows an exemplary process architecture for implementing the message processing engine 50. The system architecture includes the following components which are implemented by software using dedicated and/or shared hardware resources. A component is a legacy Global Distribution System (GDS) reservation engine 41 which produces legacy GDS change commit indications. Another component is an NDC reservation engine 40 which produces NDC PNR change commit indications and marks these change commits with a flag indicating that these change commit indications are NDC change commit indications (i.e., according to the first standard) and are to be processed in accordance with the NDC standard, unless for message targets to be notified that operate still in accordance with the second legacy standard such as TTY message targets. Another component is an NDC message generating and sequencing process 42 which generates all sorts of reservation messages, such as TTY messages, XML messages, or other types of message. The NDC message generating and sequencing process 42 computes message dependency maps. Another component is a TTY message sequencing engine 43 which forms a part of the NDC message generating and sequencing process 42. The TTY message sequencing engine 43 computes dependency characteristics of TTY messages which determines the sending order of TTY messages as, e.g., described by EP 2254046 B1. A message priority table 44 stores message priority values. The message priority values are pre-computed based on analysis results and can be updated whenever requested or adequate. Another component is a dependency map and message table 45 which stores dependency maps at at least two levels, namely dependency maps at message envelope level for message envelope and dependency chains at message level for messages. Another component is a message sending state machine 46 which is the main process to control message sending and to update the dependency map at envelope level and the dependency chains at message level. The message sending state machine 46 includes a message queue 46*a* and two sub processes, namely a message sender subprocess 47 which consistently dequeues and sends out messages to targets 49, as well as a message response receiver subprocess 48 which is a listener on message replies. The target response receiver subprocess 48 commits the sender dequeue operations and updates the dependency maps at message envelope level and the dependency chains at message level in order to track changes in the dependency map and message table 45 in response to receipt confirmation responses received from message targets 49.

These system architecture components interact with each other in the following manner as illustrated by the arrows connecting blocks in FIG. 6.

The NDC reservation engine 40 creates a new database record e.g., in response to a new travel reservation or updates an existing data record in response to a change of an existing travel reservation. The creation of the new database record and the update of the existing database record, respectively, generates change commit indications which the NDC reservation engine 40 publishes (arrow N01) to the NDC message generating and sequencing process 42. All publications originating from the NDC reservation engine 42 are marked (e.g., flagged) as NDC reservation change commits, i.e., as database change commit indications originating from the NDC reservation engine 40.

Similarly, the legacy GDS reservation engine 42 may create a new database record e.g., in response to a new travel reservation or updates an existing data record in response to a change of an existing travel reservation. The creation of the new database record and the update of the existing database record, respectively, generate a change commit indication which the legacy GDS reservation engine 42 publishes (arrow N02) to the NDC message generating and sequencing process 42. However, the change commit indications published by the legacy GDS reservation engine 40 are not marked or flagged.

In response to receiving a change commit indication from the legacy GDS reservation engine 42, the NDC message generating and sequencing process 42 generates only TTY messages for message targets to be notified.

In response to receiving database change commit indications from the NDC reservation engine 40, the NDC message generating and sequencing process 42 generates message envelopes for NDC message targets to be notified and messages associated with the respective message envelopes. To this end, the NDC message generating and sequencing process 42 retrieves message priority values from the message priority table 44 (arrow N05 representing retrieval requests and arrow N06 representing retrieval responses), as well as retrieves information about current message envelopes and associated messages from the dependency map and message table 45 and inserts newly generated message envelopes and associated messages into the dependency map and message table 45 (arrow N03 representing retrieval and insertion requests and arrow N04 representing retrieval and insertion responses). The interactions of the NDC message generating and sequencing process 42 with the message priority table 44 and dependency map and message table 45 will be explained further below on the basis of a particular example.

Furthermore, the NDC message generating and sequencing process 42 may determine that a particular message does not depend on any other message which means that this message is ready to be sent to the message target 49. In this situation, the NDC message generating and sequencing process 42 retrieves the particular message from the dependency map and message table 45 via operations N03 (retrieval request) and N04 (retrieval response), generates a message queue item representing the particular message and puts the message queue item to the message queue 46*a* of the message sending state machine 46 via operation N07.

Subsequently, the message queue item is dequeued by the message sending state machine 46 by operation N08 and sent (arrow N09) by the message sender subprocess 47 to the correct message target 49. A message response (such as an acknowledgement of receipt) may be received (arrow N10) from the message target 49 by the message response receiver subprocess 48 of the message sending state machine 46.

After the response from the message target 49 has been received, i.e., the particular message has been successfully delivered to the message target 49, the message sending state machine 46 updates the message dependency status of the particular message in the dependency map and message table 45 (arrow N11). This update may render the next message or messages to be independent from any other message, i.e., sending of this next message or these next messages can be initiated next. To this end, the message that has become independent by successful delivery of the particular message beforehand is retrieved (arrow N12) by the message sending state machine 46 and queued into the message queues 46a. Operations N08, N09 and N10 are then executed in the same manner as described above.

An example of the message priority table 44 is as follows:

| Message Target | Message Type | Message Name | Priority Value |
|---|---|---|---|
| YY | XML | DEL | 90 |
| YY | TTY | TTY | 50 |
| YY | XML | ADD | 10 |
| YY | NEW | GEN | NULL |
| ZZ | XML | DEL | 95 |
| ZZ | TTY | TTY | 90 |
| ZZ | XML | ADD | 70 |
| ZZ | XML | SPLIT | 0 |

The column "Message Target" defines the message destinations, i.e., lists all known message targets 49. The column "Message Type" indicates the message standard, i.e., either according to a legacy standard such as message type TTY or according to a current standard such as NDC which uses XML messages. Depending on the message standard/type, there may be messages of different message subtypes which are indicated in the column "Message Name". As shown in the above example, the legacy standard may not provide for different message types so that all TTY messages are referred to as message name TTY. However, the new standard using XML-type messages may define different messages such as delete messages ("DEL") and add messages ("ADD"). Still a third standard ("NEW") may define generic messages ("GEN").

The column "Priority Value" defines the message priority value for all the messages of a given message type and message name to be addressed to a particular message target. Hence, the priority values allow differentiating between messages on the levels of message target, standard and message subtype/name. In the above example, the values in the "Priority Value" column have the following meanings: A priority value of 0 means that the message is not to be sent out at all. This is sensible e.g., for cases where messages with a certain function are already specified by the first standard, but not yet supported by actually deployed message targets. In the above table 44 example, this is e.g., the case for the SPLIT message which is already generated internally by the message processing engine 50, but not (yet) sent out due to lack of implementation at the message targets. If no priority value is set ("NULL"), the message can be sent when there is no dependency at the level of message envelopes. Messages of an envelope are interdependent according to their priority values from higher value to lower value.

The message priority table 44 is generally static, but configurable at any time. New targets can be added, new message types can be added for the various targets and also new message names can be added for a given message type. Moreover, existing rows can be updated or deleted, e.g., when a particular target is to be removed. The priority values can be reconfigured as well.

In some embodiments, the message priority table 44 is not hosted by database system, but stored in the form of memory cache file of e.g., a batch server. The cache file can be synchronized with any server as required or adequate. For example, changes to the message priority table 44 may be made by a content management system of the batch server and then broadcast to all deployed servers.

On the other hand, the dependency map and message table 45 is highly dynamic because the dependency map and message table 45 represents the current status of the message processing system at any given point of time. Thus, in some embodiments, the dependency map and message table 45 is hosted by a database system. The message processing system described herein may run multiple live sessions for reading, inserting and updating the dependency map and message table 45 in real-time.

An exemplary definition of the columns of the dependency map and message table 45 is as follows:

| Column Name | Definition |
|---|---|
| ID | Message identifier number. |
| P | Reference key identifying the associated reservation record of the NDC reservation engine 40 or legacy GDS reservation engine 41. P-Key-Order and/or a string of letters and numbers |
| I | Change commit number: P(i) represents the $i^{th}$ database change commit for reservation record P |
| J | Message target |
| RD_STAT | Dependency status at message envelope level |
| D_STAT | Dependency status at message level |
| D_ID | Dependency identifier indicating the message envelope or message on which the message envelope or message depends |
| N | Message name |
| TYPE | Message type |
| Message | The generated message itself. $M_j^{P(i),n}(x)$ represents the $x^{th}$ message to be sent to target j, generated for change commit i of reservation record P and the message name is n. |

The two dependency states RD_STAT and D_STAT may take the values "sent" (S) if the message has been sent, or "void" (V) if there is no message to be sent to the target (e.g., the table entry represents a message envelope as opposed to a message), or "dependent" (D) if the message has a dependency on another message at message level or if the message envelope of the message has a dependency on another message envelope, or "N" if no dependency exists (=ready to be sent) or "unknown" (U) when the dependency has not yet been identified, e.g., a corresponding message is missing at the moment, i.e., still outstanding at the NDC message generating and sequencing process 42. Table entries represent message envelopes if the RD_STAT cell is filled and the D_STAT cell is kept empty. For example, the message envelope for the messages list of $\{M_j^{P(i),n}(x)\}$ is denoted as $R_j^{P(i)}$.

Figure 7:
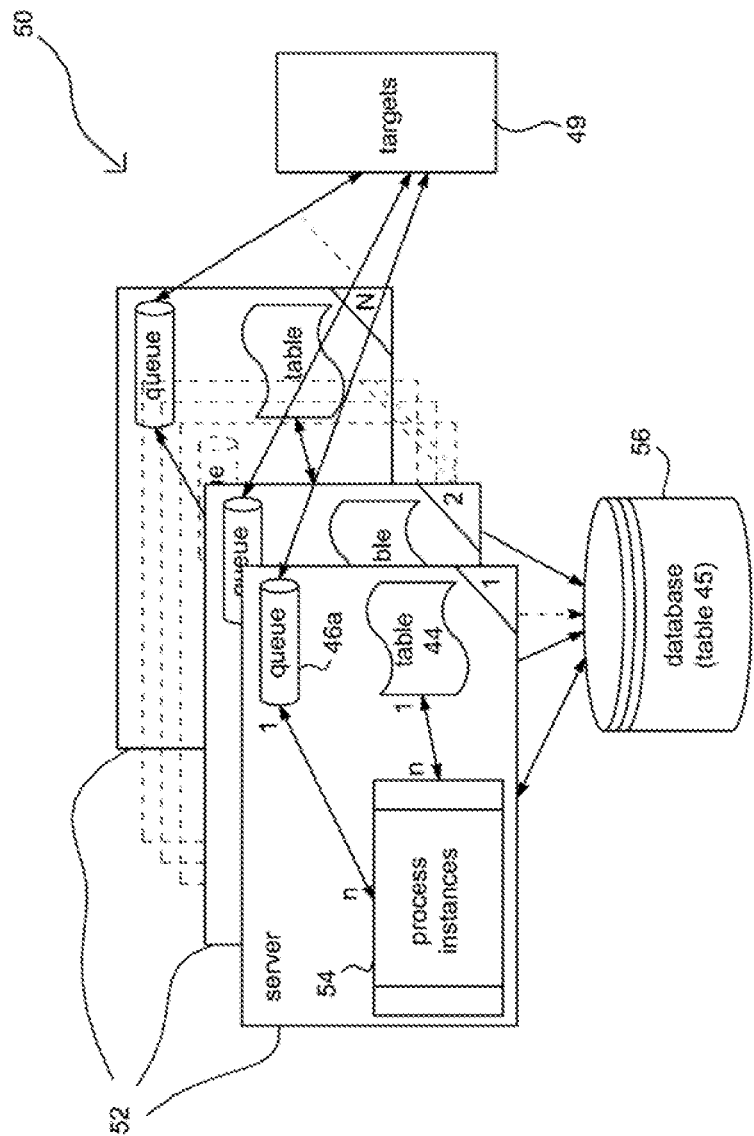
FIG. 7 depicts an exemplary hardware architecture for the message processing system.

In some embodiments, the message processing system 50 is deployed as an array of servers 52 with respective potentially multiple process instances 54, as shown in FIG. 7. Load balance features may distribute the message processing loads across the process instances 54 of a server 52 and/or across the servers 52 of the server array. Therefore, the message processing system 50 is extendable in order to cope with a potential traffic increase.

The message processing system 50 features at least one database server 56 (additional databases may be present for reasons of redundancy and/or performance) maintaining the dependency map and message table 45. All process instances 54 are connected to the database server 56. Globally seen, the message processing system 50 constitutes one stage in an information processing chain of a larger distributed system comprising all components shown in FIG. 6 and further components such as travel agency clients. On the other hand, the message processing system 50 performs parallel processing, as each individual process instance 54 is capable of processing one record envelope at a time.

As explained above, the NDC message generating and sequencing process 42 is the main process of the message processing system 50. The NDC message generating and sequencing process 42 contains the legacy TTY message sequencing engine 43 and interacts with message priority table 44 and dependency map and message table 45. The operations N01 to N07 shown by FIG. 6 may be implemented by the exemplary process flowchart of FIG. 8 as described next.

Whenever a database change commit indication is received at 602 from either the NDC reservation engine 40 or the legacy GDS reservation engine 41, the NDC message generating and sequencing process 42 firstly builds, at 604, a list of message targets 49 which are affected by the database change commit and thus will receive one or more messages informing the target about the reservation record change occurred in the NDC reservation engine 40 or the legacy GDS reservation engine 41.

Figure 8:
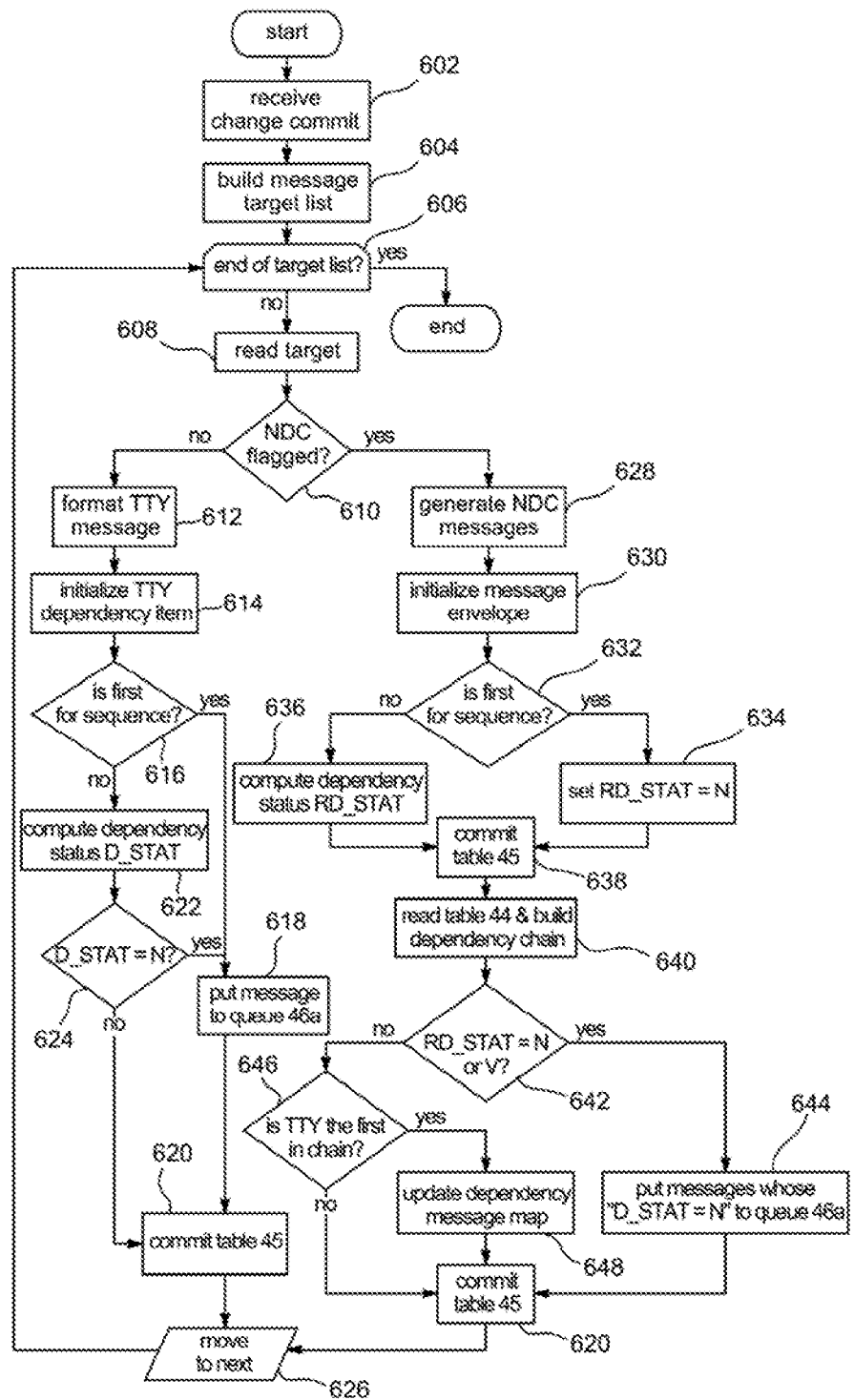
FIGS. 8 and 9 are more detailed flow charts for an implementation example of the message and dependency processing.

Generally, messages for different targets 49 are not of dependent relationship, i.e., a first message to a first target can be sent irrespective of the status of a second message directed to a second target. Hence, as already explained above, message envelope level dependencies are only established between message envelopes for the same message target and, naturally, message level dependencies are only established between messages of a message envelope and thus between message for one and the same message target. Consequently, as shown by FIG. 8, the NDC message generating and sequencing process 42 processes the message targets 49 in the list one after another. For a given database change commit indication, a message dependency map is built or extended by either generating a new message envelope with one or more messages (right-hand side of FIG. 8) or a legacy message (left-hand side of FIG. 8) for each message target to be notified by the following activities shown by FIG. 8.

At 606, the NDC message generating and sequencing process 42 checks whether the end of the message target list established in 604 has been reached. If this is the case, the process of FIG. 8 terminates as the received database change commit indication has been processed completely. If this is not the case, the process proceeds to the next message target 49 on the message target list, reads this next target at 608 and determines whether the next target operates according to the first standard (i.e., NDC in this example) or according to the second legacy standard (i.e., only processes TTY messages in this example). The process then checks at 610 whether the received database change commit indication is marked as an NDC commit, i.e., whether it is a commit indication of the NDC reservation engine 40 or the legacy GDS reservation engine 41.

The two determinations of boxes 608 and 610 determine whether the current receiver is processed via the left-hand side or via the right-hand side of FIG. 8. In response to determining that the database change commit indication originates from the NDC reservation engine 40 and is thus in line with the first standard and the current message target operates according to the first standard, the "yes branch" of box 610 is chosen. In all other cases, i.e., in response to determining that the database change commit indication originates from the legacy GDS reservation engine 41 at 610 and/or that the current message target operates according to the second legacy standard at 608, the "no branch" of box 610 is chosen. Both branches of the overall process depicted by FIG. 8 use the dependency map and message table 45.

The left-hand side "no branch" of box 610 stores message level dependencies as well as the messages themselves in the dependency map and message table 45, unless TTY messages are sent directly as no other previously pending messages for the message target considered are pending. The right-hand "yes branch" of box 610 stores dependencies at message envelope level and at the message level as well as the messages themselves in the dependency map and message table 45.

For legacy/non-NDC message targets and/or legacy change commit indications, the NDC message generating and sequencing process 42, more specifically the TTY sequencing engine 43, generates a TTY message by activities 612 to 624. The TTY message is formatted at 612, a TTY dependency item is initialized at 614. Here, message priority values for TTY messages are retrieved from the message priority table 44. If 616 determines that the current TTY message is the first message for the target picked from the lists at 606, i.e., there are no previous TTY messages pending for this target, the TTY message is passed to the message sending state machine 46 and directly put into the queue 46a. The dependency map and message table 45 is then committed at 620 and the overall process moves to the next target on the target list at 626. If the end of the target list is now reached, as verified at 606, the process terminates.

In response to determining, at 616, that one or more other XML, and/or TTY messages are already pending for the current message target previously picked at 606, the NDC message generating and sequencing process 42 computes a message level dependency status of the TTY message at 622, i.e., the parameter D_STAT is set for the TTY message. If D_STAT is computed to be "N", i.e., no dependency exists for the TTY message, the TTY message can be directly sent to the message target 49. Thus, similarly as described above, the TTY message is passed to the message sending state machine 46 and directly put into the queue 46a at 618 and the process proceeds as described above. If operation 624 determines any other dependency state of the message than "N", the dependency map and message table 45 is then committed at 620 and the overall process moves to the next target on the target list at 626.

Further details of processing TTY legacy messages are described in EP 2254046 B1, in particular in FIG. 5, FIG. 6 and FIG. 7 of EP 2254046 B1 and the accompanying description in paragraphs [0030] to [0034] which are incorporated by reference herein.

For message targets 49 that implement the NDC standard, as determined at 608, and provided that the currently processed change commit indication is NDC flagged, as determined at 610, the NDC message generating and sequencing process 42 generates one or more NDC messages by activities 612 to 624 of FIG. 8.

At 628, one or more messages are generated in accordance with the first standard (here: NDC on XML, basis) and/or in accordance with the second standard (here: legacy message standard on TTY basis). The operations 630 and 632 are functionally similar to operations 614 and 616, but—different to 614 and 616—relates to a dependency chain at the message envelope level. At 630, a message envelope for the one or more NDC messages is created and the dependency status of the message envelope, RD_STAT, is initialized. The check at 632 determines whether the created message envelope is the first message envelope for the current target 49 considered in the current loop in the message envelope dependency map stored in the dependency map and message table 45. In response to determining at 632 that there is no previous message envelope for the current target 49, the newly created message envelope has no dependency and the parameter RD_STAT is then set to N accordingly at 634. On the other hand, in response to determining at 632 that one or more message envelopes for the current target 49 are already present in the dependency map and message table 45, the parameter RD_STAT is then set to D accordingly at 636. After the RD_STAT is computed at 634 or 636, the process 638 is called to store the message envelope present in the dependency map and message table 45.

After the successful commit on the dependency map and message table 45 at 638, the process 640 is called to build a message dependency chain of $\{M_j^{P(i),n}(x)\}$, i.e., the dependencies of the messages within the message envelope directed to the target 49 of the current loop. Operation 640 makes use of the predefined message priority values in the message priority table 44.

Figure 9:
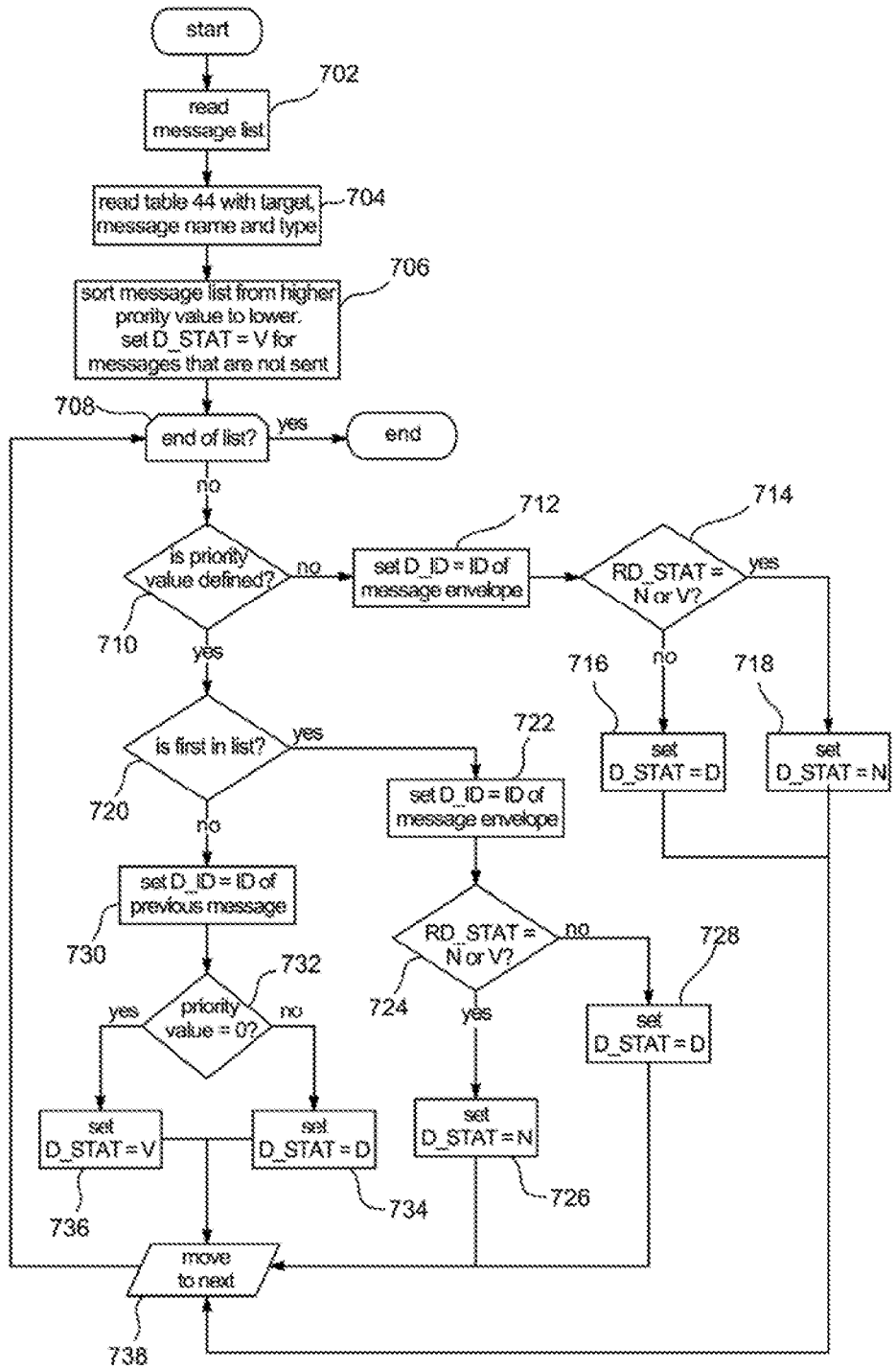

FIG. 9 shows a detailed flowchart diagram of operation 640. Now referring to FIG. 9, the inputs of operation 640 of FIG. 8, as depicted at 702 of FIG. 9, are i) the message envelope $P_j^{P(i)}$, ii) message list, $\{M_j^{P(i),n}(x)\}$ and iii) message names, types, and targets of the messages in the message list.

The outputs are the list of dependency items that are built for the inputs. The first processes, 704 and 706, aim to read the message priority table 44 and find out the priority values of the messages $M_j^{P(i),n}(x)$ in the message list. The input message list then is sorted from higher priority values to lower priority values. The sorted message list is denoted as $\{M_j^{P(i),n}(x)'\}$.

Once the messages are sorted in order, then looping each of the messages in the message list via check 708, check 710 first determines if the currently considered message has a valid priority value defined in message priority table 44. In response to determining that the currently considered message has a valid priority value at 710, the further check 720 is called to determine whether the message is first message in the message list, $M_j^{P(i),n}(1)$. If yes, the D_ID of message $M_j^{P(i),n}(1)'$ is assigned to the ID of $R_j^{P(i)}$, at 722. It is then further checked 724 if the RD_STAT value of $R_j^{P(i)}$ is N or V, i.e., if the message envelope is independent from other message envelopes. If this is true, then the current message is set to be independent at 726, i.e., D_STAT value for e $M_j^{P(i),n}(1)'$=N. If not, the message is set to dependent at 728, i.e., D_STAT value for e $M_j^{P(i),n}(1)'$=D. The process of FIG. 9 then moves to the next message in the message list at 738.

If the message processed in the current loop is not the first message anymore, as determined at 720, the D_ID of message $M_j^{P(i),n}(x)'$ is assigned to the ID of the message $MM_j^{P(i),n}(x-1)'$, at 730. A further check 732 is then performed in order to determine if the priority value of the message of the current loop equals to 0. As mentioned above, a priority value of 0 means that the message is not to be sent out at all. Hence, if priority value=0 is recognized, and D_STAT of $M_j^{P(i),n}(x)'$ is set to V. If not, D_STAT of $M_j^{P(i),n}(x)'$ is set to D in the operations 734 and 736, respectively. The process of FIG. 9 then moves to the next message in the message list at 738.

If the priority value of the current message is determined to be not defined at 710, this means that the message is only dependent on the message envelope $R_j^{P(i)}$. Hence, the D_ID is always set to the ID of $R_j^{P(i)}$ at 712 (which is identical with operation 722) and D_STAT of the message is set to D at 716 or to V at 718, depending on whether RD_STAT of the message envelope is determined to be N or V at 714. The process of FIG. 9 then moves to the next message in the message list at 738.

Now again referring to FIG. 8, after the operation 640 is concluded, the check 642 on the message envelope dependency RD_STAT is called to determine if the messages of the message envelope can be put in the message queue 46a for sending. If RD_STAT=N, the operation 644 is executed to put the first message of the message envelope, i.e., $M_j^{P(i),n}(1)'$, into the queue 46a for sending at first. Then, other messages of the message envelope, $M_j^{P(i),n}(x)'$, whose D_STAT equals to N are also put into the queue 46a at 644.

If RD_STAT of the message envelope is determined at 642 to be not N, a further check 646 is performed in order to determine if a TTY message is $M_j^{P(i),n}(1)'$ in the message dependency map for the message target 49 of the current loop. If this is affirmative, the message dependency map is updated at 648. More specifically, $\{M_j^{P(i),n}(x)'\}$ is updated in order to link the D_ID of $M_j^{P(i),n}(1)'$ to the TTY message of P(i-1) or to the message envelope $R_j^{P(i-1)}$, if no TTY is present, at 648.

At this stage, after operations 644, 646 and 648, respectively, have been concluded, the computation of the message list $\{M_j^{P(i),n}(x)'\}$ is completed and thus the dependency chain for the (P(i),j) is defined. In addition, all messages whose D_STAT=N have all put into the message queues 46a for sending these messages to the message targets 49. The results are then stored in the database through the commit operation 620. The process of FIG. 8 then moves to the next message target in the target list at 626.

The NDC message generating and sequencing process 42 can be further explained with reference to an exemplary update history of the message list, for example in the illustrative Table I and Table II set out below, both of which are examples of the dependency map and message table 45 at a particular point of time.

In this update history example, commit indications with respect to two reservation records, AAAAAA and BBBBBB, are received by the NDC message generating and sequencing process 42. Two message targets 49, referred to as YY and ZZ, are concerned with these two reservation records and are thus receivers of messages generated by the message processing system 50. For message envelope entries, only the first six columns are filled. Message entries do not include values for the fifth column RD_STAT as this parameter refers to the dependency on message envelope level.

TABLE I

Dependency maps of processing message envelopes 0 and 1

| ID | P | I | J | RD_STAT | D_ID | D_STAT | N | TYPE | Message |
|---|---|---|---|---|---|---|---|---|---|
| 001 | AAAAAA | 0 | YY | S | NULL | NULL | NULL | NULL | NULL |
| 002 | BBBBBB | 0 | ZZ | S | NULL | NULL | NULL | NULL | NULL |
| 003 | AAAAAA | 0 | YY | NULL | 001 | S | TTY | T | $M_{YY}^{A(0),TTY}(1)'$ |
| 004 | AAAAAA | 1 | ZZ | N | 001 | NULL | NULL | NULL | NULL |
| 005 | AAAAAA | 1 | ZZ | NULL | 004 | S | DEL | X | $M_{ZZ}^{A(1),DEL}(1)'$ |
| 006 | BBBBBB | 0 | ZZ | NULL | 002 | V | TTY | T | $M_{ZZ}^{B(0),TTY}(1)'$ |

TABLE I-continued

Dependency maps of processing message envelopes 0 and 1

| ID | P | I | J | RD_STAT | D_ID | D_STAT | N | TYPE | Message |
|---|---|---|---|---|---|---|---|---|---|
| 007 | AAAAAA | 1 | ZZ | NULL | 005 | N | TTY | T | $M_{ZZ}^{A(1),TTY}(2)'$ |
| 008 | BBBBBB | 0 | ZZ | NULL | 006 | S | ADD | X | $M_{ZZ}^{B(0),ADD}(2)'$ |
| 009 | BBBBBB | 1 | YY | N | 002 | NULL | NULL | NULL | NULL |
| 010 | BBBBBB | 1 | YY | NULL | 009 | N | TTY | Y | $M_{ZZ}^{B(1),TTY}(1)'$ |
| 011 | AAAAAA | 1 | YY | N | 001 | NULL | NULL | NULL | NULL |
| 012 | AAAAAA | 1 | YY | NULL | 011 | N | ADD | X | $M_{YY}^{A(1),XML}(1)'$ |

Message envelopes AAAAAA(0) and BBBBBB(0) are the first respective first message envelopes of the reservation records AAAAAA and BBBBBB. Thus, the table entries with the ID 001 and 002 are each detected as being the "first for sequence" in the check 632 in FIG. 8. AAAAAA(1) is not the first message envelope, but the first message envelope related to the reservation record AAAAAA where at least one message is generated for the message target ZZ. As a consequence, the message envelope table entry with the ID 004 is detected as "first for sequence" at check 632 in FIG. 8 as well. These message envelope table entries do not have the parameter D_ID set and their respective RD_STAT is set to "V", as shown in Table I, because these message envelopes do not depend on other message envelopes for the respective message targets 49. Therefore, messages, $M_{YY}^{A(0),TTY}(1)$ and $M_{ZZ}^{A(1),DEL}(1)$ can be sent out immediately once they are generated by the NDC message generating and sequencing process 42, and their D_STAT is updated to S. $M_{ZZ}^{B(0),TTY}(1)'$ is the first message in the message list $\{M_{ZZ}^{B(0),n}(x)'\}$, but it is computed as no need to be sent (for example, because this TTY message has no functional effects on the message target, or the message target is known to be unsubscribed to TTY message, etc., see EP 2254046 B1, para. [0032] and FIG. 7 which are incorporated by reference herein for further background), hence its D_STAT is finally updated as V. Then message $M_{ZZ}^{B(0),ADD}(2)'$ is then sent and its D_STAT is updated to S.

Messages $M_{ZZ}^{A(1),TTY}(2)'$, $M_{YY}^{B(1),TTY}(1)'$ and $M_{YY}^{A(1),XML}(1)'$ are computed and they are ready to be put into the message queue 46 a for sending.

Triggered by further changes to the database records AAAAAA and BBBBBB, database change commit indications 2 and 10 of database record AAAAAA and database change commit indication 2 of BBBBBB, are received by the NDC message generating and sequencing process 42 at the moment when the processing of the message envelopes and message according to Table I is completed by the NDC message generating and sequencing process 42 and the dependency map and message table 45 has just been committed. The messages passed to the message queues 46a are not yet sent out to the targets 49.

In response to receiving the indications of the change commits 2 and 10 of database record AAAAAA and change commit 2 of database record BBBBBB, two further message lists, namely $\{M_{YY}^{A(2),TTY}(1), M_{YY}^{A(2),DEL}(2), M_{YY}^{A(2),NDC}(3)\}$ and $\{M_{ZZ}^{A(2),TTY}(1), M_{ZZ}^{A(2),SPLIT}(2)\}$, are generated by the NDC message generating and sequencing process 42 for change commit indication AAAAAA(2). Furthermore, one message list, namely $\{M_{YY}^{A(10),TTY}(1), M_{YY}^{A(10),ADD}(2)\}$, is generated for the change commit indication AAAAAA(10), and one message list $\{M_{YY}^{B(2),TTY}(1), M_{YY}^{B(2),ADD}(2), M_{YY}^{B(2),DEL}(3)\}$, is generated for the change commit indication BBBBBB(2). Table II depicts the dependency map and message table 45 after all these message lists have been processed by the NDC message generating and sequencing process 42.

TABLE II

Dependency maps of processing message envelopes 2 and 10

| ID | P | I | J | RD_STAT | D_ID | D_STAT | N | TYPE | Message |
|---|---|---|---|---|---|---|---|---|---|
| 001 | AAAAAA | 0 | YY | S | NULL | NULL | NULL | NULL | NULL |
| 002 | BBBBBB | 0 | ZZ | S | NULL | NULL | NULL | NULL | NULL |
| 003 | AAAAAA | 0 | YY | NULL | 001 | S | TTY | T | $M_{YY}^{A(0),TTY}(1)'$ |
| 004 | AAAAAA | 1 | ZZ | N | 001 | NULL | NULL | NULL | NULL |
| 005 | AAAAAA | 1 | ZZ | NULL | 004 | S | DEL | X | $M_{ZZ}^{A(1),DEL}(1)'$ |
| 006 | BBBBBB | 0 | ZZ | NULL | 002 | V | TTY | T | $M_{ZZ}^{B(0),TTY}(1)'$ |
| 007 | AAAAAA | 1 | ZZ | NULL | 005 | N | TTY | T | $M_{ZZ}^{A(1),TTY}(2)'$ |
| 008 | BBBBBB | 0 | ZZ | NULL | 006 | S | ADD | X | $M_{ZZ}^{B(0),ADD}(2)'$ |
| 009 | BBBBBB | 1 | YY | N | 002 | NULL | NULL | NULL | NULL |
| 010 | BBBBBB | 1 | YY | NULL | 009 | N | TTY | Y | $M_{ZZ}^{B(1),TTY}(1)'$ |
| 011 | AAAAAA | 1 | YY | N | 001 | NULL | NULL | NULL | NULL |
| 012 | AAAAAA | 1 | YY | NULL | 011 | N | ADD | X | $M_{YY}^{A(1),XML}(1)'$ |
| 013 | BBBBBB | 2 | YY | D | NULL | NULL | NULL | NULL | NULL |
| 014 | BBBBBB | 2 | YY | NULL | 013 | D | DEL | X | $M_{YY}^{B(2),DEL}(1)'$ |
| 015 | BBBBBB | 2 | YY | NULL | 014 | D | TTY | T | $M_{YY}^{B(2),TTY}(2)'$ |
| 016 | AAAAAA | 2 | ZZ | D | 004 | NULL | NULL | NULL | NULL |
| 017 | AAAAAA | 2 | YY | D | 011 | NULL | NULL | NULL | NULL |
| 018 | AAAAAA | 2 | ZZ | NULL | 007 | D | TTY | T | $M_{ZZ}^{A(2),TTY}(1)'$ |
| 019 | AAAAAA | 2 | YY | NULL | 017 | D | DEL | X | $M_{YY}^{A(2),DEL}(1)'$ |
| 020 | BBBBBB | 2 | YY | NULL | 015 | D | ADD | X | $M_{YY}^{B(2),ADD}(3)'$ |
| 021 | AAAAAA | 2 | ZZ | NULL | 018 | V | SPLIT | X | $M_{ZZ}^{A(2),SPLIT}(2)'$ |
| 022 | AAAAAA | 2 | YY | NULL | 019 | D | TTY | T | $M_{YY}^{A(2),TTY}(2)'$ |

TABLE II-continued

Dependency maps of processing message envelopes 2 and 10

| ID | P | I | J | RD_STAT | D_ID | D_STAT | N | TYPE | Message |
|---|---|---|---|---|---|---|---|---|---|
| 023 | AAAAAA | 2 | YY | NULL | 017 | D | NDC | N | $M_{YY}^{A(2),NDC}(3)'$ |
| 024 | AAAAAA | 10 | YY | U | NULL | NULL | NULL | NULL | NULL |
| 025 | AAAAAA | 10 | YY | NULL | 024 | D | TTY | T | $M_{YY}^{A(10),TTY}(1)'$ |
| 026 | AAAAAA | 10 | YY | NULL | 025 | D | ADD | X | $M_{YY}^{A(10),ADD}(2)'$ |

The sorted list $\{M_{YY}^{A(2),n}(x)'\}$ is made based on the priority value definition of message priority table 44, as derivable from the table entries with IDs 019, 022 and 023. Their message envelope $R_{YY}^{A(2)}$ is stored as table entry with ID 017. The two messages $M_{YY}^{A(2),DEL}(1)'$ and $M_{YY}^{A(2),NDC}(3)'$ have the same dependency parameter D_ID that links both messages to $R_{YY}^{A(2)}$, as caused by checks in 710 and 720 as well as operations 712 and 722 (FIG. 9).

The message envelope $R_{ZZ}^{A(2)}$ and the sorted list $\{M_{ZZ}^{A(2),n}(x)'\}$ are stored as table entries with IDs 016, 018 and 021. $M_{ZZ}^{A(2),TTY}(1)'$ has its dependency status D_ID linked to $M_{ZZ}^{A(1),TTY}(2)'$ instead of $R_{ZZ}^{A(2)}$, having been output by checks 642 and 646 as well as operation 648 in FIG. 8. The dependency status D_ID of $M_{ZZ}^{A(2),SPLIT}(2)'$ is computed as 018 in operation 730 in FIG. 9), but the message status D_STAT is computed as V due to the check 732 and operation 736 (FIG. 9).

The message envelope $R_{YY}^{B(2)}$ and the message list $\{M_{YY}^{B(2),n}(x)'\}$ are stored as the table entries with IDs 013, 014, 015 and 020. Message envelope $R_{YY}^{A(10)}$ and the message list $\{M_{YY}^{A(10),n}(x)'\}$ are stored as table entries with IDs 024 to 026. The RD_STAT of the message envelope $R_{YY}^{A(10)}$ is computed as U (Unknown) at block 630 in FIG. 8 (e.g., because, for some reason, the change commit indication 10 has arrived at the message generating and sequencing process 42 before change commit indication 9, and a publication context inside the change commit indication 10 shows that a previous change commit indication exists, then the message envelope dependency status is set to U in order to wait for the arrival of change commit indication 9. Details about the computation of the Unknown status are also explained in EP 2254046 B1 in paras. [0031] and [0032] and FIG. 7 which are incorporated by reference herein), and all messages have a dependency status D_STAT of D, which means they will only be queued for sending when the message envelope dependency RD_STAT of their message envelope is resolved to N.

Figure 10:
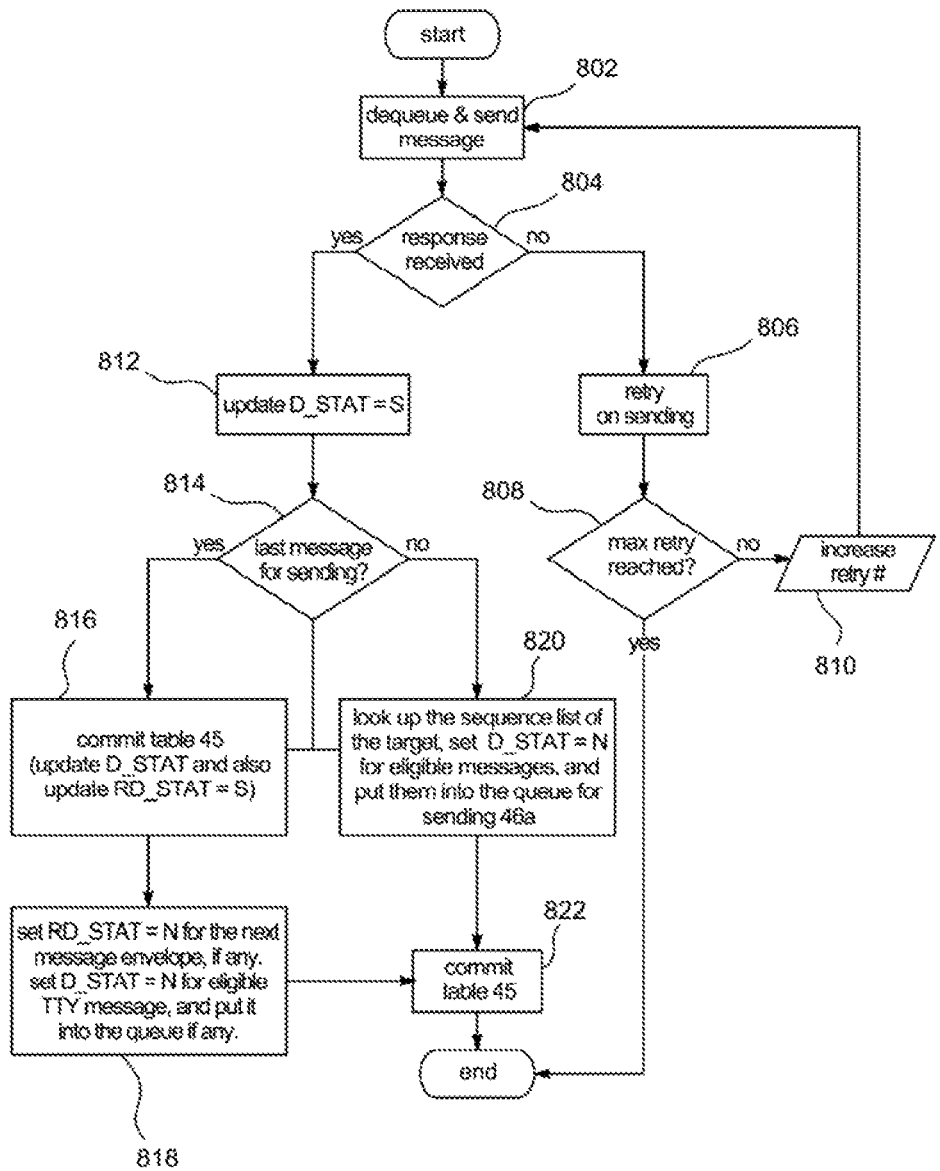
FIG. 10 is a detailed flow chart for an implementation example of a message sending process.

With reference to FIG. 10, the message sending state machine 46 is responsible for sending messages that are queued into the message queues 46a, updating the dependency status D_STAT of these messages from N to S as well as updating the status of their message envelopes and remaining messages in the message envelopes held in the dependency map and message table 45 after they have been sent to the target 49, i.e., in response to receipt confirmations received from the message targets, and finally putting further messages eligible for sending to the message queues 46a.

The message sending state machine 46 is active whenever a message is present in the message queue 46a. The message sending state machine 46 dequeues the message and sender process 47 sends the message at block 802 through an established communication channel defined for the message type to the correct message target 49. Legacy TTY messages and XML message may be sent through different communication channels (e.g., TTY messages in an asynchronous manner using a dedicated channel and XML messages in a synchronous manner by using SOAP/HTTP). Once a message is dequeued and sent, based on the message sending method (synchronous or asynchronous), the receiver process 48 checks at block 804 whether a confirmation response from the target system (for synchronous mode) or e.g., from an internal message delegator system (for asynchronous mode) is present, as described by EP 2693337A1. A message is marked as "Sent" (S) at block 812 only when a valid confirmation response is received from the message target 49 and no error code/information is presented inside the confirmation response. The retry operation constituted by the operations in blocks 806, 808 and 810 is a secured method to repeat send operations for unsuccessfully delivered messages (no valid confirmation response received within a given time interval after message transmission or confirmation response with error code received), in asynchronous mode. Optionally, messages exceeding a given maximum retry number are marked and stored in the queue for recovery if they are not finally sent out (not shown by FIG. 10).

When it is determined, at block 804, that a valid and correct response is received for the message $M_j^{P(i),n}(y)'$, the dependency status D_STAT of the message is updated to status S (sent) at 812.

Next, operation 814 is then called to check if $M_j^{P(i),n}(y)'$ is the last message in the message list $\{M_j^{P(i),n}(x)'\}$. If yes, the operation 816 updates the message envelope level dependency status RD_STAT of $R_j^{P(i)}$ to status S (Sent) and stored in the dependency map and message table 45, also storing the D_STAT update of operation 812. After that, at 818, the dependency status of the next message envelope of the message envelope level dependency chain P(i+1), if present, is set to RD_STAT=N (no dependency), as all messages of the current message envelope have been sent and, thus, the overall message envelope has been processed completely. In addition, still at 818, all messages whose D_ID is set to the ID of $R_j^{P(i+1)}$, according to the dependency map and message table 45, are updated to set their dependency status D_STAT to N. These messages are also put into the message queue 46a for sending, at 818. Finally, the dependency map and message table 45 is committed once more at 822 in order to store the most recent changes to the next message envelope $R_j^{P(i+1)}$ in the dependency chain at message envelope level and the next message list $\{M_j^{P(i+1),n}(x)'\}$, i.e., the messages of the next message envelope.

If the current message is determined at 814 to be not the last message of the message list, the operation 820 is called to select eligible messages for sending: all messages whose D_ID is set to the ID of $M_j^{P(i),n}(y)'$ (i.e., all messages that depend on the current message that has been successfully delivered to the target) are selected from the dependency map and message table 45, their dependency status D_STAT is set to N and these messages are put into the message queue 46a for sending. After that, the operation 822 is invoked to commit the dependency map and message table 45 in order to store the most recent changes to the message lists $\{M_j^{P(i),n}(x)'\}$ and $\{M_j^{P(i+1),n}(x)'\}$.

The message sending state machine 46 can be further illustrated with reference to Table II already discussed above. Firstly, dependency maps are updated after the successful sending of $M_{ZZ}^{A(1),TTY}(2)'$, $M_{ZZ}^{B(1),TTY}(1)'$ and $M_{YY}^{A(1),XML}(1)'$, as shown in FIG. 11 with Table III, depicting the state of the dependency map and message table 45 at that point.

When the last message of a message list, i.e., within a message envelope $R_j^{P(i)}$, is sent successfully to the message target, the message envelope table entry in the dependency map and message table 45 is updated to complete the message sending process for the current message envelope $R_j^{P(i)}$.

For example, the following table entries are updated at operation 816 in FIG. 10, as visualized by arrows in FIG. 11. The successful transmission of message with ID=007 sets D_STAT=S which means that all messages of the message envelope with ID=004 have been sent. Accordingly, the message envelope level dependency can be set to "sent" as well, i.e., RD_STAT of the message envelope ID=004 is set to S. The message with ID=010 is the only message of message envelope ID=009. Thus, when message ID=010 is successfully transmitted, its D_STAT is set to S and the message envelope level dependency can be set to "sent" as well, i.e., RD_STAT of the message envelope ID=009 is set to S. Likewise, message with ID=012 is the only message of message envelope ID=011. Thus, when message ID=012 is successfully transmitted, its D_STAT is set to S and the message envelope level dependency can be set to "sent" as well, i.e., RD_STAT of the message envelope ID=011 is set to S.

The updates of the message envelope level dependencies then continue with the next envelopes $R_j^{P(i+1)}$ that depend on the message envelopes $R_j^{P(i)}$ that have been set to RD_STAT=S in operation 818 of FIG. 10. Generally, the RD_STAT of next message envelope $R_j^{P(i+1)}$ is updated to N whenever the message envelope $R_j^{P(i)}$ on which message envelope $R_j^{P(i+1)}$ depends is set to S.

In the example of Table III in FIG. 11, these are the following transitions (again indicated by the respective arrows in FIG. 11). In response to setting RD_STAT of the message envelope ID=004 to S, the message envelope level dependency status of message envelope with ID=016 depending on message envelope ID=004 (i.e., having D_ID=004) is set to RD_STAT=N. In response to setting RD_STAT of the message envelope ID=009 to S, the message envelope level dependency status of message envelope with ID=013 depending on message envelope ID=009 (i.e., having D_ID=009) is set to RD_STAT=N. In response to setting RD_STAT of the message envelope ID=011 to S, the message envelope level dependency status of message envelope with ID=017 depending on message envelope ID=011 (i.e., having D_ID=011) is set to RD_STAT=N.

In response to these updates of the message envelope level dependency status RD_STAT, the first messages of the updated message envelopes, i.e., messages that have dependency on $R_j^{P(i+1)}$, are updated and queued for sending at operation 818 in FIG. 10.

For example, again referring to FIG. 11, the following messages are marked to be not dependent anymore. In response to setting RD_STAT of the message envelope ID=013 to N, the message level dependency status of the message with ID=014 being the first message in message envelope ID=013 (i.e., having D_ID=013) is set to D_STAT=N and passed to the message queue 46a. In response to setting RD_STAT of the message envelope ID=017 to N, the message level dependency status of the two messages with ID=019 and ID=023 being both first messages in message envelope ID=017 (i.e., having D_ID=017, i.e., there is no dependency between these two messages) is set to D_STAT=N and both messages are passed to the message queue 46a.

The operation 818 of FIG. 10 also checks if any legacy message level dependencies exists that are to be updated due to the successfully sent messages and messages having been set to N (independent). For example, legacy standard message ID=018 relating to change commit indication 2 (i.e., I=2) has a message level dependency on message ID=007 (i.e., D_ID=007) that belonged to message envelope ID=004 and has been sent successfully. Hence, dependency status of message ID=018 is set to N and the message ID=018 is passed to the message queue 46a for sending as well.

For completeness, it is to be noted that the legacy message ID=018 is a special case since it is one optional functional of the message processing engine 50 to build a direct message level dependency chain among legacy TTY messages for each message target for the same database record. Legacy message ID=007 in the message envelope ID=004 is a usual message having a message level dependency on message ID=005 within message envelope ID=004. On the other hand, the legacy message ID=018 actually belong to the message envelope ID=016 and its D_ID should therefore be 016. However, as it is a legacy message, a particular legacy dependency computation process sets its D_ID=007 instead of D_ID=016 because sending the legacy message ID=018 right after legacy message=007 does not affect the sequence and dependency of any potential other XML messages in the message envelope (here: message with ID=021), i.e., the message level dependency chain is kept for the NDC flagged change commit indications.

The dependency maps defined by the dependency map and message table 45 after the first messages mentioned above (messages with IDs 014, 019, 023 and 018) are successfully sent are shown in Table IV of FIG. 12. The message level dependency status of the messages with IDs 014, 019, 023 and 018 are set to D_STAT=S in response to the receiver process 48 receiving respective receipt confirmation responses.

Next, the operation 820 of FIG. 10 updates the message level dependency status of the next messages in the respective message envelopes based on the message level dependency chain being defined by the dependency map and message table 45.

In the example of FIG. 12, the following dependency updates are done at the message level. In response to the successful transmission of message ID=014, the message level dependency status of the message ID=014 is set to "sent", i.e., D_STAT=S. The message level dependency status of the next message depending on the message ID=0014, namely message with ID=015 (having D_ID_014) is then set to independent, i.e., D_STAT=N, and message ID_015 is passed to the message queue 46a for sending. Likewise, in response to the successful delivery of message ID=019, the message level dependency status of the message ID=019 is set to "sent", i.e., D_STAT=S. The message level dependency status of the next message depending on the message ID=0019, namely message with ID=022 (having D_ID_019) is then set to independent, i.e., D_STAT=N, and message ID_022 is passed to the message queue 46a for sending.

Further, at the message envelope level, the message envelope with ID=016 ($R_{ZZ}^{A(2)}$) is updated to S as message with ID=018 ($M_{ZZ}^{A(2),TTY}(1)'$) was the only message in the dependency chain to be sent to message target ZZ (the message ID=021 also belongs to the message envelope ID=016, but has a void status (D_STAT=V) and will therefore not be sent) and message ID=018 has been sent.

The dependency maps defined by the dependency map and message table 45 are shown in FIG. 13 with Table V after all messages mentioned above are sent. FIG. 13 also indicates the following updates of the message envelope level dependencies and message level dependencies. After message with ID_022 has been successfully sent, its message level dependency status D_STAT is set to S. This also means that all messages of the message envelope with ID=017 have been successfully delivered. Accordingly, the message envelope level dependency can be set to "sent" as well, i.e., RD_STAT of the message envelope ID=017 is set from N to S. After message with ID_015 has been successfully sent, its message level dependency status D_STAT is set to S. The next message depending on message ID_015 is the message with ID=020 (having D_ID=015). Hence, the message level dependency of message ID=015 is set to N and the message is passed to the message queue 46a for sending. FIG. 13 then already indicates by "(S)" that message level dependency status of message ID=020 will later be set to "sent" in response to receiving a corresponding confirmation response from the message target YY. FIG. 13 then also indicates that, in response to determining successful delivery of message ID_020, the message envelope dependency status of message envelope ID=013 will be set to "sent" (S) because message ID=020 was the last message of this message envelope.

Figure 14:
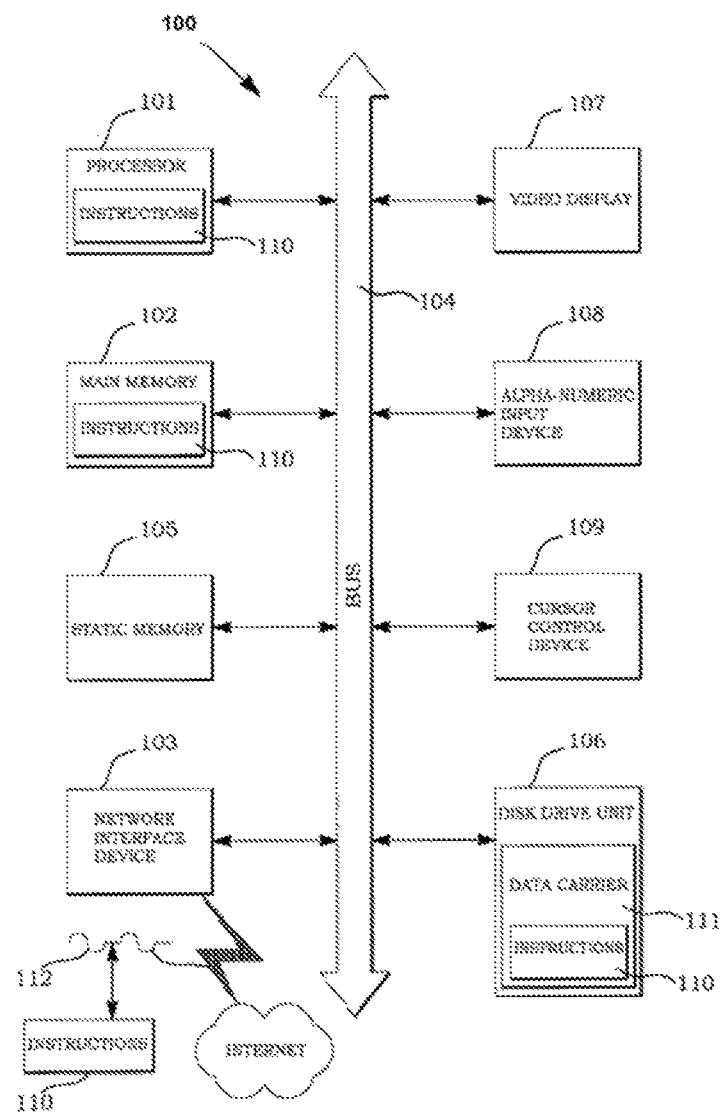
FIG. 14 is an exemplary schematic view of the internal architecture of the database table and/or a request client.

Finally, FIG. 14 is a diagrammatic representation of a computer system 100 which provides the functionality of message processing system 50 described above. The computer system 100 may include a set of instructions to cause the computer system 100 to perform any of the methods and activities of the message processing system 50 as elaborated above. The computer system 100 includes one or more processors 101, a main memory 102 and a network interface device 103 which communicate with each other via a bus 104. The at least one processor 101 includes at least one CPU cache holding the program instructions for performing the message processing methodologies described herein. Optionally, the computer system 100 may further include a static memory 105 and a disk-drive unit 106. A video display 107, an alpha-numeric input device 108 and a cursor control device 109 constitute a man-machine interface in order to operate the computer system 100. The network interface device 103 is a wired and/or wireless interface which connects the message processing system 50 to any number and sorts of other systems, including NDC reservation engine 40, legacy GDS reservation engine 41 and message targets 49. The message targets 49 may reside on the Internet and/or any other network. The network interface device 103 utilizes either standard communication protocols such as the HTTP/TCP/IP protocol stack, IEEE 802.11 and/or proprietary communication protocols.

A set of instructions (i.e., software) 110 embodying any one, or all, of the methodologies described above, resides completely, or at least partially, in or on a machine-readable medium, e.g., the main memory 102 and/or the at least one processor 101 with the at least one CPU cache. Among others, the instructions may implement the functions of the message processing system to process incoming database change commits, to generate message envelopes and messages as well as to queue and send messages as described in detail above. A machine-readable medium on which the software 110 resides may also be a non-volatile data carrier 111 (e.g., a non-removable magnetic hard disk or an optical or magnetic removable disk) which is part of disk drive unit 106.

To summarize, the methodologies described herein facilitate the generation of dependency chain at both, message envelope level and message level. The dependency relations between the message envelopes and messages are configurable by (re-)defining given message priority values. Overall, a generic framework is presented that supports both legacy message flows e.g., based on TTY messages as well as more sophisticated hybrid message flows according to a state-of-the art standard such as NDC. The framework is extendible as future even more sophisticated standards and message flows can be seamlessly added.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flowcharts, sequence diagrams, and/or block diagrams.

In certain alternative embodiments, the functions, acts, and/or operations specified in the flowcharts, sequence diagrams, and/or block diagrams may be re-ordered, processed serially, and/or processed concurrently consistent with embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A system comprising:
a processor;
a message processing engine configured to determine message targets of a distributed messaging system that are affected by database commit indications, the distributed messaging system including a first subset of message targets configured to operate according to a first standard and a second subset of message targets configured to operate according to a second standard that is distinct from the first standard; and
a computer-readable storage medium comprising instructions that upon execution by the processor cause the system to perform operations, the operations comprising:
determine, by the message processing engine, that a database commit indication affects a first message target among the first subset of message targets;
create a message envelope and a message within the message envelope for the database commit indication; and
transmit the message to the first message target as part of a sequence of messages,
wherein an order of the sequence of messages is determined using a message dependency map for the first message target, and the message dependency map establishes dependencies at a message envelope level and at a message level.

2. The system of claim 1, wherein the first subset of message targets are further configured to process messages in accordance with the second standard, and wherein the second subset of message targets are unable to process messages in accordance with the first standard.

3. The system of claim 1, wherein each message within the message envelope is addressed to the first message target, and wherein a transmission order of each message within the message envelope is determined based on the dependencies established by the message dependency map at the message level.

4. The system of claim 1, wherein the message envelope is a first message envelope and the message is a first message, wherein the sequence of messages include a second message within a second message envelope associated with the first message target, and wherein the second message precedes the first message in the order of the sequence of messages based on the dependencies established by the message dependency map at the message envelope level.

5. The system of claim 1, wherein the message processing engine includes a message response receiver sub-process configured to update the dependencies of the message dependency map at the message envelope level and at the message level in response to receiving confirmation responses from the message targets.

6. The system of claim 1, wherein the instructions upon execution further cause the system to:
generate a second message formatted in accordance with the second standard when the dependencies of the message dependency map at the message envelope level define the message envelope as a pending message envelope;
associate the second message with the message envelope based on the message envelope being defined as the pending envelope; and
update the dependencies of the message dependency map at the message level for the message envelope to account for the second message.

7. The system of claim 1, wherein the instructions upon execution further cause the system to:
assign a given priority value to each message among a plurality of interdependent messages within the message envelope; and
update the dependencies of message dependency map at the message level for the message envelope based on the assigned priority values.

8. The system of claim 1, wherein the dependencies of the message dependency map at the message level for the message envelope are based, in part, on respective functions of messages within the message envelope.

9. The system of claim 1, wherein the first standard is compliant with the New Distribution Capability standard of the International Air Transport Association.

10. A method comprising:
determining, by a message processing engine, that a database commit indication originates from a database system that operates in accordance with a second standard, the message processing engine configured to determine message targets of a distributed messaging system that are affected by database commit indications, the distributed messaging system including a first subset of message targets configured to operate according to a first standard that is distinct from the second standard and a second subset of message targets configured to operate according to the second standard;
determining, by the message processing engine, that the database commit indication affects a first message target among the first subset of message targets;
generating a message addressed to the first message target that is formatted in accordance with the second standard; and
transmitting the message to the first message target as part of a sequence of messages,
wherein an order of the sequence of messages is determined using a message dependency map for the first message target, and the message dependency map establishes dependencies at a message envelope level and at a message level.

11. The method of claim 10, further comprising:
building a list of message targets of the distributed messaging system that is affected by the database commit indication,
wherein the list of message targets includes the first message target and a second message target among the second subset of message targets.

12. The method of claim 11, wherein the message is a first message, and wherein the method further comprises:
generating a second message addressed to the second message target that is formatted in accordance with the second standard; and
transmitting the second message to the second message target without referencing the message dependency map.

13. The method of claim 10, wherein the message processing engine is further configured to refrain from creating message envelopes or generating messages that are formatted in accordance with the first standard when database commit indications originating from database systems operating in accordance with the second standard are received.

14. The method of claim 10, further comprising:
associating the message with a pending message envelope for the first message target; and
updating the dependencies of the message dependency map at the message level for the pending message envelope to account for the message.

15. The method of claim 10, wherein message level dependencies established by each message dependency map for a given message envelope are based, in part, on respective formatting standards of messages within the given message envelope.

16. The method of claim 10, wherein transmitting the message to the first message target comprises:
directly transmitting the message to the first message target without regard to the dependencies at the message level when a priority level assigned to the message exceeds any priority level assigned to messages within a pending message envelope for the first message target.

17. The method of claim 10, further comprising:
determining, by the message processing engine, that a second database commit indication affects a plurality of message targets among the first subset of message targets; and
creating, for each message target among the plurality of message targets, a respective message envelope corresponding to the second database commit indication.

18. The method of claim 10, further comprising:
updating the dependencies of the message dependency map at the message envelope level and at the message level in response to receiving confirmation responses from the message targets.

19. The method of claim 10, wherein transmitting the message to the first message target comprises:
passing the message to a message sending queue in response to determining that the message does not depend on successful delivery of another message addressed to the first message target.

20. A non-transitory computer-readable storage medium, storing program instructions that upon execution by a processor of a computing device, cause the computing device to perform operations comprising:
determine, by a message processing engine, that a database commit indication originates from a database system that operates in accordance with a second standard, the message processing engine configured to determine message targets of a distributed messaging system that are affected by database commit indications, the distributed messaging system including a first subset of message targets configured to operate according to a first standard that is distinct from the second standard and a second subset of message targets configured to operate according to the second standard;
determine, by the message processing engine, that the database commit indication affects a first message target among the first subset of message targets;
generate a message addressed to the first message target that is formatted in accordance with the second standard; and
transmit the message to the first message target as part of a sequence of messages, wherein an order of the sequence of messages is determined using a message dependency map for the first message target, the message dependency map establishing dependencies at a message envelope level and at a message level.

* * * * *